(12) United States Patent
Kim et al.

(10) Patent No.: US 12,366,643 B2
(45) Date of Patent: Jul. 22, 2025

(54) METHOD FOR CALIBRATION OF LIDAR AND IMU, AND COMPUTER PROGRAM RECORDED ON RECORDING MEDIUM FOR EXECUTING METHOD THEREFOR

(71) Applicant: MOBILTECH, Seoul (KR)

(72) Inventors: Jae Seung Kim, Seoul (KR); Sun Jae Jeong, Hwaseong-si (KR)

(73) Assignee: MOBILTECH, Seoul (KR)

( * ) Notice: Subject to any disclaimer, the term of this patent is extended or adjusted under 35 U.S.C. 154(b) by 0 days.

(21) Appl. No.: 18/745,417

(22) Filed: Jun. 17, 2024

(65) Prior Publication Data
US 2024/0426989 A1    Dec. 26, 2024

(30) Foreign Application Priority Data

Jun. 20, 2023    (KR) .................. 10-2023-0078770

(51) Int. Cl.
*G01S 7/497*      (2006.01)
*G01S 17/89*      (2020.01)
(Continued)

(52) U.S. Cl.
CPC .............. *G01S 7/497* (2013.01); *G01S 17/89* (2013.01); *G06V 10/40* (2022.01); *G06V 20/58* (2022.01)

(58) Field of Classification Search
CPC ......... G01S 7/497; G01S 17/89; G06V 20/58; G06V 10/40
See application file for complete search history.

(56) References Cited

U.S. PATENT DOCUMENTS

2004/0246147 A1* 12/2004 von Grabe ........... G08G 1/0104
                                                 340/995.13
2018/0038936 A1* 2/2018 Khan .................... G01S 5/0247
(Continued)

FOREIGN PATENT DOCUMENTS

| JP | 2020-528994 A | 10/2020 |
| JP | 2022-008790 A | 1/2022 |
| KR | 10-2022-0085186 A | 6/2022 |

OTHER PUBLICATIONS

Yaqi Shen et al., "Reliable Inlier Evaluation for Unsupervised Point Cloud Registration", AAAI Conference on Artificial Intelligence, Febuary 23, 2022, pp. 2198-2206.
(Continued)

*Primary Examiner* — Michael J Dalbo
*Assistant Examiner* — Kaleria Knox
(74) *Attorney, Agent, or Firm* — Bridgeway IP Law Group, PLLC; Jihun Kim

(57) ABSTRACT

Proposed is a calibration method for a lidar and an IMU using features according to the shape of a specific object included in point cloud data. The method may include placing point cloud data acquired by a lidar mounted on a vehicle on a predefined world coordinate system, by a data generator, extracting a region to be used for calibration from the placed point cloud data, by the data generator, identifying at least one object included in the extracted region, by the data generator, and performing calibration on the point cloud data by fitting point cloud included in the at least one identified object to a pre-stored model, by the data generator. The present method is a technology developed with support from the Ministry of Land/KAIA (Project No. RS-2021-KA160637).

8 Claims, 16 Drawing Sheets

(51) Int. Cl.
*G06V 10/40* (2022.01)
*G06V 20/58* (2022.01)

(56) References Cited

U.S. PATENT DOCUMENTS

| | | | |
|---|---|---|---|
| 2018/0190016 A1* | 7/2018 | Yang | G06V 20/58 |
| 2020/0003869 A1* | 1/2020 | Yang | G01S 17/86 |
| 2020/0401823 A1 | 12/2020 | Miller et al. | |

OTHER PUBLICATIONS

Shuaixin Li et al., "3D LiDAR/IMU Calibration Based on Continuous-time Trajectory Estimation in Structured Environments", IEEE Access, Sep. 22, 2021, pp. 1-14, vol. 4, 2016.

* cited by examiner

METHOD FOR CALIBRATION OF LIDAR AND IMU, AND COMPUTER PROGRAM RECORDED ON RECORDING MEDIUM FOR EXECUTING METHOD THEREFOR

CROSS-REFERENCE TO RELATED APPLICATION

This application claims priority from Republic of Korea Patent Application No. 10-2023-0078770, filed on Jun. 20, 2023, which is hereby incorporated by reference in its entirety.

BACKGROUND

Field

The present disclosure relates to calibration. More particularly, the present disclosure relates to a calibration method for a lidar and an IMU using features according to the shape of a specific object included in point cloud data, and a computer program recorded on a recording medium to execute the method.

Related Art

Automatic driving of a vehicle refers to a system that enables the vehicle to make its own decisions and drive autonomously. The automatic driving may be divided into progressive stages ranging from non-automation to full automation, depending on the degree to which the system is involved in driving and the degree to which a driver controls the vehicle. Generally, the stages of the automatic driving are classified into six levels by the Society of Automotive Engineers (SAE) International. According to the six levels classified by the SAE International, level 0 is non-automation, level 1 is driver assistance, level 2 is partial automation, level 3 is conditional automation, level 4 is high automation, and level 5 is full automation.

The automatic driving is performed through the mechanism of perception, localization, path planning, and control. In addition, various companies are developing systems to implement perception and path planning in the automatic driving mechanism using artificial intelligence (AI).

For the automatic driving, various pieces of information about the road should be preemptively collected. However, actually, it is not easy to collect and analyze enormous amounts of information in real time using only the sensor of the vehicle. Thus, in order for the automatic driving to be realized, a high-definition road map that may provide various pieces of information required for the actual automatic driving is essential.

Here, the high-definition road map refers to a 3D electronic map constructed with information on roads and surrounding terrain with an accuracy of +25 cm. Such a high-definition road map includes detailed information such as road width, road curvature, road gradient, lane information (dashed lines, solid lines, stop lines, etc.), surface information (crosswalks, speed bumps, shoulders, etc.), pavement markings, sign information, and facility information (traffic lights, curbs, manholes, etc.), in addition to information found in a typical electronic map (node information and link information required for route guidance).

In order to create the high-definition road map, various related data such as Mobile Mapping Systems (MMS) or aerial photography information are required.

In particular, the MMS is mounted on the vehicle to measure the position and obtain visual information of terrain features around the road while driving the vehicle. That is, the MMS may be generated based on pieces of information collected by a Global Positioning System (GPS) that acquires information about the position and pose of a vehicle body, an Inertial Navigation System (INS), an Inertial Measurement Unit (IMU), a camera that collects the shape and information of terrain features, Light Detection and Ranging (LiDAR), and other sensors.

However, various sensors for acquiring, photographing or measuring data may not be physically installed at the same position, and may not be synchronized because operation is performed based on time information of each sensor.

Meanwhile, a Simultaneous Localization and Mapping (SLAM) system may estimate a pose and simultaneously establish a 3D map based on pieces of information collected by the GPS, the INS, the IMU, the camera, the lidar, and other sensors.

However, the conventional Simultaneous Localization and Mapping system is problematic in that an operation amount is large due to complex operations, so it takes a lot of time to perform tasks for localization and mapping.

The present disclosure is a technology developed with support from the Ministry of Land/KAIA (Project No. RS-2021-KA160637).

PRIOR ART DOCUMENT (Patent Document)
(Patent Document 1) Korean Patent Publication No. 10-2022-0085186, 'Method for calibration of Lidar sensor using precision map', (2022.06.22.)

SUMMARY

The present disclosure provides a calibration method for a lidar and an IMU using features according to the shape of a specific object included in point cloud data.

The present disclosure also provides a computer program recorded on a recording medium to execute a calibration method for a lidar and an IMU using features according to the shape of a specific object included in point cloud data.

The problems to be solved by the present disclosure are not limited to the above-mentioned problems, and other problems which are not mentioned will be clearly understood by those skilled in the art from the following description.

In an aspect, the present disclosure provides a calibration method for a lidar and an IMU using features according to the shape of a specific object included in point cloud data. The method may include placing point cloud data acquired by a lidar mounted on a vehicle on a predefined world coordinate system, by a data generator, extracting a region to be used for calibration from the placed point cloud data, by the data generator, identifying at least one object included in the extracted region, by the data generator, and performing calibration on the point cloud data by fitting point cloud included in the at least one identified object to a pre-stored model, by the data generator, The placing of the point cloud data may define the world coordinate system through position information measured from at least one of a Global Positioning System (GPS) and an Inertial Measurement Unit (IMU) acquired simultaneously with the point cloud data.

The extracting of the region may extract a trajectory in which a heading standard deviation indicating an error in GPS data among movement paths of the vehicle equipped with the lidar is lower than a preset value, and extracts a section that simultaneously includes trajectories with opposite directions of movement of the vehicle within the extracted trajectory.

The identifying of the object may identify a cylindrical object for horizontal fitting among the placed point cloud data, and identify a ground for vertical fitting among the placed point cloud data.

The identifying of the object may extract a region of a preset size based on a midpoint of the extracted section and perceive it as the ground.

The performing of the calibration may calculate a value, obtained by dividing the number of inlier point clouds fitted to a pre-stored cylinder model corresponding to the cylindrical object by the number of point clouds included in the cylindrical object, as a loss for the cylindrical object.

The performing of the calibration may calculate a value, obtained by dividing the number of inlier point clouds fitted to a pre-stored ground model corresponding to the ground by the number of point clouds included in the ground, as a loss for the ground.

The performing of the calibration may perform calibration on the point cloud data through a loss function based on the loss for the cylindrical object and the loss for the ground.

The performing of the calibration may add a loss for a ratio between the loss for the cylindrical object and the loss for the ground to the loss function.

The performing of the calibration may perform calibration on the point cloud data through Particle Swarm Optimization (PSO) using the loss function.

The performing of the calibration may configure at least one identified object into an octree, and perform calibration on the point cloud data using variance summation of each leaf node of the configured octree as a loss.

The performing of the calibration may configure a loss function by adding a length of the z-axis of the point cloud data to the variance summation loss, and perform calibration on the point cloud data based on the loss function.

In another aspect, the present disclosure provides a computer program recorded on a recording medium to execute the method. The computer program may be coupled to a computing device including a memory, a transceiver, and a processor processing an instruction loaded in the memory. The computer program may be recorded on the recording medium to execute placing point cloud data acquired by a lidar mounted on a vehicle on a predefined world coordinate system by the processor, extracting a region to be used for calibration from the placed point cloud data by the processor, identifying at least one object included in the extracted region by the processor, and performing calibration on the point cloud data by fitting point cloud included in the at least one identified object to a pre-stored model by the processor.

Specific details of other embodiments are included in the detailed description and drawings.

According to embodiments of the present disclosure, automatic calibration of a lidar and an IMU can be implemented with high accuracy using features according to the shape of a specific object included in point cloud data.

Effects that can be obtained by the present disclosure are not limited to the above-mentioned effects, and other effects which are not mentioned will be clearly understood by those skilled in the art from the following description.

DESCRIPTION OF EXEMPLARY EMBODIMENTS

Figure 1:
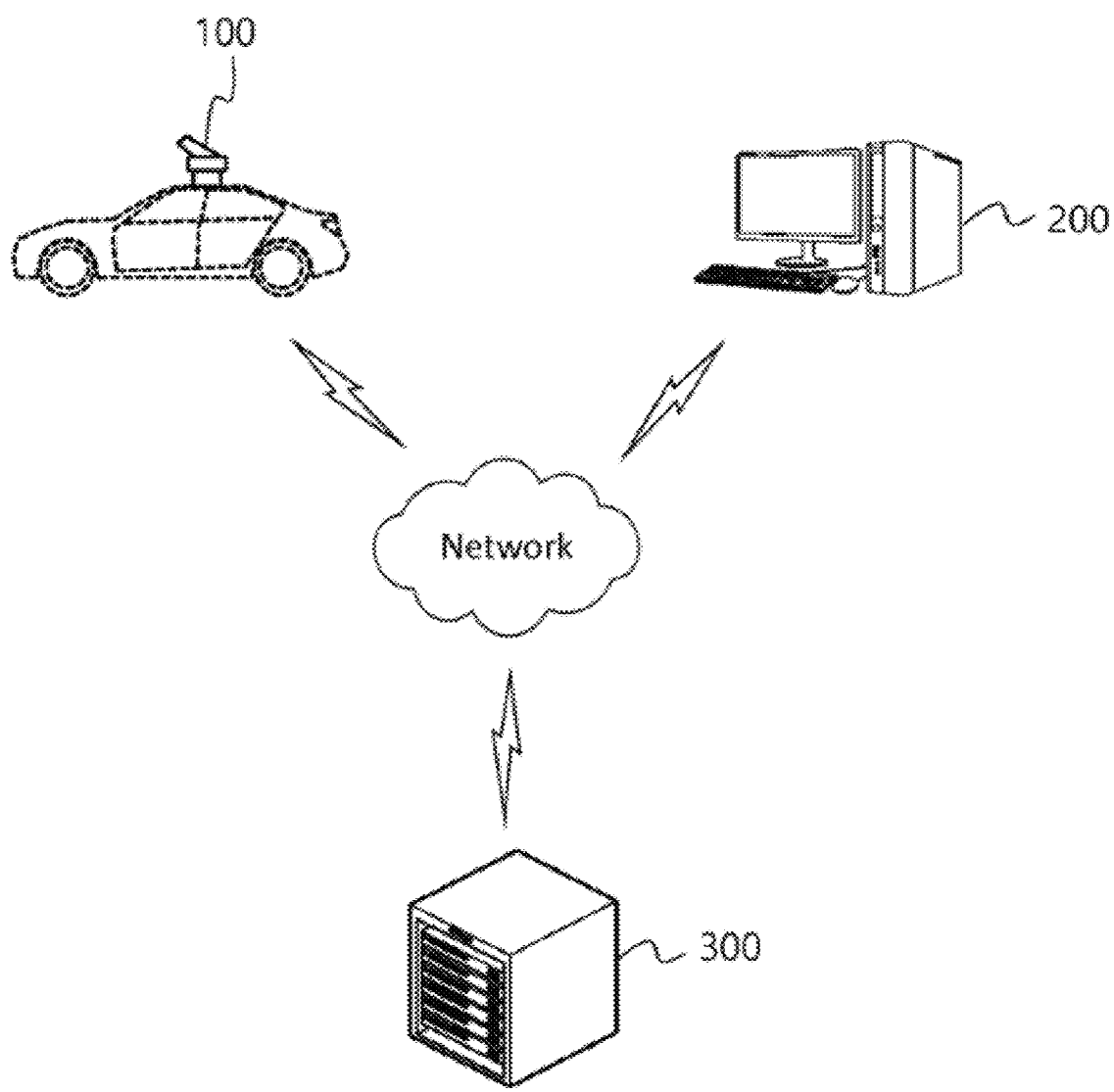
FIG. 1 is a configuration diagram of a data generation system according to an embodiment of the present disclosure.

It should be noted that technical terms used in this specification are only used to describe specific embodiments and are not intended to limit the present disclosure. Unless otherwise defined, the technical terms used herein should be interpreted as meanings generally understood by those skilled in the art in the technical field to which the present disclosure pertains, and should not be interpreted in an overly comprehensive or overly narrow sense. Further, if the technical terms used in this specification are incorrect technical terms that do not accurately express the idea of the present disclosure, they should be replaced with technical terms that can be correctly understood by those skilled in the art. Furthermore, general terms used in the present disclosure should be interpreted according to the definition in the dictionary or the context, and should not be interpreted in an excessively limited sense.

In the present disclosure, the singular forms are intended to include the plural forms as well, unless the context clearly indicates otherwise. It will be further understood that the terms "comprise", "have", etc. when used in this specification, specify the presence of stated steps or components but do not preclude the presence or addition of one or more other steps or components.

It will be understood that, although the terms "first", "second", etc. may be used herein to describe various elements, these elements should not be limited by these terms. These terms are only used to distinguish one element from another element. For instance, a first element could be termed a second element without departing from the scope of the present disclosure. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present.

Hereinafter, preferred embodiments of the present disclosure will be described in detail with reference to the accompanying drawings. Like reference numerals refer to like parts throughout various figures and embodiments of the present disclosure, and a duplicated description thereof will be omitted. When it is determined that the detailed description of the known art related to the present disclosure may obscure the gist of the present disclosure, the detailed description will be omitted. Further, it is to be noted that the accompanying drawings are only intended to easily understand the spirit of the present disclosure and are not to be construed as limiting the spirit of the present disclosure. It is to be understood that the present disclosure is intended to cover not only the exemplary embodiments, but also various alternatives, modifications, equivalents and other embodiments that fall within the spirit and scope of the present disclosure.

Meanwhile, MMS is mounted on a vehicle to measure the position of terrain features around the road and obtain visual information while driving the vehicle. In other words, MMS may be generated based on pieces of information collected by a Global Positioning System (GPS) that acquires information about the position and pose of a vehicle body, an Inertial Navigation System (INS), an Inertial Measurement Unit (IMU), a camera that collects the shape and information of terrain features, Light Detection and Ranging (LiDAR), and other sensors.

However, various sensors for acquiring, photographing, or measuring data may not be physically installed at the same position, and may not be synchronized because an operation is performed based on time information of each sensor.

Meanwhile, a Simultaneous Localization and Mapping (SLAM) system may estimate a pose and simultaneously establish a 3D map based on pieces of information collected by a GPS, an INS, an IMU, a camera, a lidar, and other sensors.

However, the conventional Simultaneous Localization and Mapping system is problematic in that an operation amount is large due to complex operations, so it takes a lot of time to perform tasks for localization and mapping.

In order to overcome the problems, the present disclosure is intended to propose various means that can perform calibration between a plurality of sensors and generate an accurate feature map.

FIG. 1 is a configuration diagram of a data generation system according to an embodiment of the present disclosure.

Referring to FIG. 1, the data generation system according to an embodiment of the present disclosure may include a data collector 100, a data generator 200, and a data processor 300.

Since the components of the data generation system according to an embodiment merely represent functionally distinct components, two or more components may be integrated with each other in an actual physical environment, or one component may be separated in the actual physical environment.

When describing each component, the data collector 100 may be mounted on the vehicle to collect data required for generating maps or learning data.

The data collector 100 may include at least one of lidar, a camera, radar, an IMU, and a Global Positioning System (GPS). However, without being limited thereto, sensors capable of sensing various pieces of information may be applied to the data collector 100 so as to generate a high-definition road map.

That is, the data collector 100 may acquire point cloud data from lidar, and acquire an image captured by the camera. Further, the data collector 100 may acquire information related to the position and pose from the IMU, GPS, or the like.

Here, the lidar may emit laser pulses around the vehicle and detect light reflected by objects located around the vehicle, thereby generating point cloud data corresponding to a 3D image around the vehicle.

The camera may acquire a spatial image collected from the lidar with the lidar as the center. Such a camera may include any one selected from a group including a color camera, a Near InfraRed (NIR) camera, a Short Wavelength InfraRed (SWIR) camera, and a Long WaveLength InfraRed (LWIR) camera.

The IMU may be composed of an Acceleration Sensor and a Gyroscope. It may also include a Magnetometer, and may detect a change in acceleration due to a change in movement of the data collector 100.

The GPS may receive a signal transmitted from a satellite and measure the position of the data collector 100 using triangulation.

Such a data collector 100 may be installed in a vehicle or an aviation device. For example, the data collector 100 may be installed on the top of the vehicle to collect surrounding point cloud data or images, or be installed on the bottom of the aviation device to collect point cloud data or an image of an object on the ground from the air.

Further, the data collector 100 may transmit the collected point cloud data or image to the data generator 200.

As the following configuration, the data generator 200 may receive the point cloud data acquired by the lidar and the image captured by the camera from the data collector 100.

The data generator 200 may generate a high-definition road map using the received point cloud data and the camera, and may generate learning data using the high-definition road map.

Typically, according to an embodiment of the present disclosure, the data generator 200 may extract one frame for the image captured by the camera and the point cloud data acquired by the lidar, and may identify a feature point for a calibration board included in one frame of each image and lidar. Further, the data generator 200 may perform calibration of the camera and lidar based on the identified feature point.

According to another embodiment of the present disclosure, the data generator 200 may place point cloud data obtained from the lidar mounted on the vehicle on a predefined world coordinate system, and extract a region to be used for calibration from the placed point cloud data. Further, the data generator 200 may identify at least one object included in the extracted region, and fit the point cloud included in at least one identified object into a pre-stored model, thereby performing calibration on the point cloud data.

According to another embodiment of the present disclosure, the data generator 200 may acquire first point cloud data obtained from a first lidar to generate a reference map, a plurality of second point cloud data obtained from a plurality of second lidars mounted on the vehicle traveling on a path on the reference map, and specification values for the first lidar and the plurality of second lidars, and may perform preprocessing on the first point cloud data and the plurality of second point cloud data. Further, the data generator 200 may perform calibration on the preprocessed first point cloud data and plurality of second point cloud data.

According to a further embodiment of the present disclosure, the data generator 200 may generate a first feature map based on the point cloud data obtained from the lidar and the image captured by the camera, and may generate a third feature map by mapping the first feature map on a second feature map generated through the pre-stored point cloud data.

Meanwhile, various embodiments of the present disclosure are described as performing separate functions, but the present disclosure may be applied by combining functions without being limited thereto.

The data generator 200 having these characteristics may use any device as long as it may transmit and receive data to and from the data collector 100 and the data processor 300 and perform calculation based on the transmitted and received data. For example, the data generator 200 may be any one of a stationary computing device such as a desktop, a workstation, or a server, but is not limited thereto.

As the following configuration, the data processor 300 may process the map generated by the data generator 200.

For example, the data processor 300 may correct facility information on the map generated by the data generator 200, or remove noise from the generated map. Further, the data processor 300 may detect a specific object in the generated map or perform light-weighting on the data.

The data processor 300 having these characteristics may use any device as long as it may transmit and receive data to and from the data collector 100 and the data generator 200 and perform calculation based on the transmitted and received data. For example, the data processor 300 may be any one of a stationary computing device such as a desktop, a workstation, or a server, but is not limited thereto.

As described above, the data collector 100, the data generator 200, and the data processor 300 may transmit and receive data using a network that combines one or more of a secure line, a public wired communication network, or a mobile communication network that directly connects devices.

For example, the public wired communication network may include ethernet, x Digital Subscriber Line (xDSL), Hybrid Fiber Coax (HFC), and Fiber to the Home (FTTH), but is not limited thereto. In addition, the mobile communication network may include Code Division Multiple Access (CDMA), Wideband CDMA (WCDMA), High Speed Packet Access (HSPA), Long Term Evolution (LTE), and 5th generation mobile telecommunication, but is not limited thereto.

Figure 2:
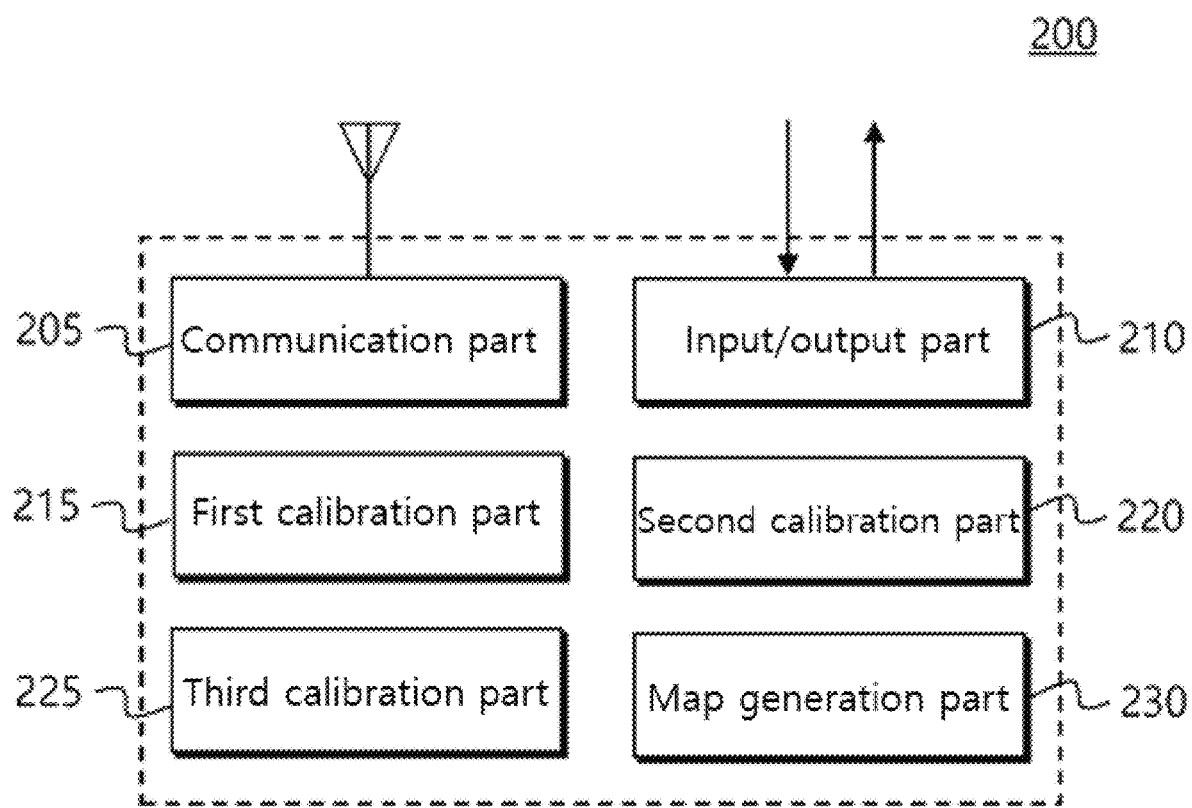
FIG. 2 is a logical configuration diagram of a data generator according to an embodiment of the present disclosure.

FIG. 2 is a logical configuration diagram of a data generator according to an embodiment of the present disclosure.

Referring to FIG. 2, the data generator 200 according to an embodiment of the present disclosure may include a communication part 205, an input/output part 210, a first calibration part 215, a second calibration part 220, a third calibration part 225, and a map generation part 230.

Since the components of the data generator 200 merely represent functionally distinct components, two or more components may be integrated with each other in an actual physical environment, or one component may be separated in the actual physical environment.

When describing each component, the communication part 205 may transmit and receive data to and from the data collector 100 and the data processor 300. Specifically, the communication part 205 may receive point cloud data obtained by the lidar and the image photographed by the camera from the data collector 100.

As the following configuration, the input/output part 210 may receive a signal from a user through a user interface (UI), or output the calculation result to the outside. Specifically, the input/output part 210 may receive setting information for performing calibration between the sensors. Further, the input/output part 210 may output the calibration result and the generated map.

As the following configuration, the first calibration part 215 may perform calibration between the camera and the lidar.

Specifically, the first calibration part 215 may extract one frame for each of the images captured by the camera and the point cloud data acquired by the lidar. At this time, each frame for the extracted image and lidar may include a calibration board.

Next, the first calibration part 215 may identify a feature point for the calibration board included in one frame for each of the extracted images and lidar.

Here, the calibration board is a rectangular checker board, and may include a border identification region that is formed at a border thereof and is formed of a material with an intensity higher than a preset value, and a top point identification region that is located on the top of the border identification region and is formed of a material with an intensity lower than a preset value.

For example, the calibration board may have a high-brightness tape formed of a material with an intensity higher than a preset value and attached along the edge of the checker board to form the border identification region. At this time, a portion of the high-brightness tape located on the top of the calibration board may be removed to form the top point identification region.

Specifically, the first calibration part 215 may identify a corner based on the size and number of calibration boards in the image captured by the camera. For example, the first calibration part 215 may extract the calibration board on the image through a source checker board image corresponding to the calibration board, the number of internal corners per checker board row and column, and the output arrangement of the detected corners, and identify the corner of the extracted calibration board.

At this time, the first calibration part 215 may identify a point corresponding to the corner using a preset pattern based on a feature point located on the top or bottom of the calibration board, and then assign an index.

For example, the first calibration part 215 may assign an index in such a way that a number increases to the lower right based on the feature point located on the top of the calibration board, or assign an index in such a way that the number increases to the upper left based on the feature point located on the bottom of the calibration board.

Further, the first calibration part 215 may detect the calibration board from the point cloud data based on the border identification region with a relatively high intensity on the calibration board, and identify the feature point within the detected calibration board.

Specifically, the first calibration part 215 may generate a virtual plane based on the point cloud included in the border identification region, and connect the outermost points for each channel in the generated virtual plane to generate a plurality of straight lines. Further, the first calibration part 215 may detect the vertices of the calibration board based on the intersection of the plurality of generated straight lines, and identify the feature point of the calibration board based on the detected vertices.

That is, the first calibration part 215 may identify four vertices included in the calibration board, and identify the feature point of the calibration board based on the pre-stored size and number of calibration boards. Here, the feature point of the calibration board identified in the point cloud data may correspond to the feature point identified in the image.

In this regard, the first calibration part 215 may match the index of the feature point identified from the previously identified image with the feature point identified from the lidar, based on the top point identification region of the calibration board.

Further, the first calibration part 215 may perform calibration of the camera and lidar based on the feature point identified from each of the images and point cloud data.

Specifically, the first calibration part 215 may calculate external parameters including a rotation value and a translation value based on the feature point of the calibration board included in each of the images and point cloud data, and perform calibration based on the calculated external parameters.

In this case, the first calibration part 215 may individually calculate the rotation value and the translation value. Preferably, the first calibration part 215 may calculate the rotation value, and then calculate the translation value.

First, the rotation value may be calculated through the following Equation when defined as the rotation value from the first view point to the second view point.

$$|(f_1 * Rf'_1)(f_2 * Rf'2)(f_3 * Rf'_3)| = 0 \quad \text{[Equation]}$$

(Here, R represents the rotation value, and f and f' represent the ray from the first view point and the second view point to the feature point of the calibration board included in the point cloud data.)

The translation value may be calculated through a loss function based on RPE (Re-Projection Error). Here, RPE may refer to a degree to which a point observed in the image is projected onto the image and distorted.

As the following configuration, the second calibration part 220 may perform calibration of the lidar and IMU using features according to the shape of a specific object included in the point cloud data obtained from the lidar.

Specifically, the second calibration part 220 may place the point cloud data obtained from the lidar mounted on the vehicle on a predefined world coordinate system.

At this time, the second calibration part 220 may define a world coordinate system through the position information measured from at least one of the Global Positioning System (GPS) and the Inertial Measurement Unit (IMU) simultaneously with the point cloud data.

Next, the second calibration part 220 may extract a region to be used for calibration from the placed point cloud data.

Specifically, the second calibration part 220 may extract a trajectory in which a heading standard deviation indicating the error in GPS data among movement paths of the vehicle equipped with the lidar is lower than a preset value, and extract a section within the extracted trajectory in which vehicles travel in opposite directions.

Generally, the GPS data is post-processed data using various data such as GPS, IMU, Distance Measurement Instrument (DMI), and base station information. Even after GPS data is post-processed using other data, errors may occur due to objects such as tall buildings made of highly reflective materials.

Meanwhile, calibration may increase accuracy if it is performed at a position where the error in GPS data is lowest. Thus, the second calibration part 220 may extract the most appropriate path that may be used for calibration in the entire section.

Meanwhile, Table 1 below shows the configuration of GPS data.

TABLE 1

| Variable | Content | Unit |
|---|---|---|
| TIME | Time | Sec |
| Easting | IMU World x | m |
| Northing | IMU World y | m |
| Up | IMU World z | m |
| Roll | IMU roll | degree |
| Pitch | IMU pitch | degree |
| Heading | True north direction | degree |
| EastVel | World x velocity | m/s |
| NorthVel | World y velocity | m/s |
| UpVel | World z velocity | m/s |
| EastSD | World x standard deviation | m |
| NorthSD | World y standard deviation | m |
| UpSD | World z standard deviation | m |
| RollSD | IMU roll standard deviation | degree |
| PitchSD | IMU pitch standard deviation | degree |
| HeadingSD | IMU north standard deviation | degree |
| xAngVel | Roll velocity | degree/s |
| yAngVel | Pitch velocity | degree/s |
| zAngVel | Heading velocity | degree/s |

Referring to Table 1, if a heading value indicating true north is incorrect, the point cloud shape of the object to be used for calibration will collapse. Thus, the second calibration part 220 may extract a trajectory whose heading standard deviation is lower than a preset value.

Further, when calibration is performed on a section where the vehicle travels in one direction among trajectories in which the heading standard deviation is lower than a preset value, a generated map may be distorted because a slope is not taken into account. Thus, the second calibration part 220 may extract a section within the extracted trajectory that simultaneously includes a trajectory in which the vehicles travel in opposite directions.

For example, the second calibration part 220 may generate the heading standard deviation as 10-quantile, extract the trajectory of the lower 10% of the heading standard deviation, and check whether two or more separate trajectories fit within a window while driving the sliding window of a predetermined size. At this time, if two or more trajectories exist within the window, it may be determined whether trajectories with opposite directions exist by calculating the average heading value of each trajectory. If the trajectories exist, the corresponding region may be determined as an appropriate trajectory for calibration.

Next, the second calibration part 220 may identify at least one object included in the extracted region.

Meanwhile, the most suitable shape of the object to use for calibration is a spherical shape that may consider all of the x-axis, y-axis, and z-axis. That is, the spherical shape may identify distortions in any direction. However, in reality, objects with the spherical shape are relatively rare.

As another method, when performing calibration on a wall, it is possible to perform calibration in a direction perpendicular to the wall. However, since it is difficult to perform calibration in a direction horizontal to the wall, calibration may be performed on the horizontal direction using two or more walls that are parallel to each other.

Therefore, the second calibration part 220 uses a cylindrical object that exists in relatively large quantities in reality and is capable of horizontal fitting for calibration. That is, the second calibration part 220 may identify the cylindrical object for horizontal fitting among the placed point cloud data. For example, the cylindrical object may include a streetlight, a utility pole, a traffic light, etc.

Further, the second calibration part 220 may identify the ground for vertical fitting among the placed point cloud data. At this time, the second calibration part 220 may extract a region of a preset size based on the midpoint of an extracted section and perceive it as the ground. That is, the second calibration part 220 may extract a region of a preset size on the ground based on the x-axis and y-axis from the midpoint of the extracted trajectory, under the assumption that the vehicle equipped with the data collector 100 runs on the road.

Next, the second calibration part 220 may perform calibration on the point cloud data by fitting the point cloud included in at least one identified object into a pre-stored model.

Specifically, the second calibration part 220 may calculate a value, obtained by dividing the number of inlier point clouds fitted to a pre-stored cylinder model corresponding to the cylindrical object by the number of point clouds included in the cylindrical object, as a loss for the cylindrical object.

Further, the second calibration part 220 may calculate a value, obtained by dividing the number of inlier point clouds fitted to the pre-stored ground model corresponding to the ground by the number of point clouds included in the ground, as the loss for the ground.

The second calibration part 220 may perform calibration on the point cloud data using a loss function based on the loss for the cylindrical object and the loss for the ground.

That is, the second calibration part 220 may configure a loss function as shown in the code below.

$$\text{double loss} = (-1) * \text{pole\_loss} + (-1) * \text{ground\_loss}$$

(Here, pole_loss represents a loss for the object, and ground_loss represents a loss for the ground.)

Here, assuming that the number of point clouds for the identified object is n and the number of inliers in the fitted cylinder model is i when the RANSAC algorithm is applied using the cylinder model, the loss for the object may be calculated through the code below.

pole_loss=$i/n$

Further, assuming that the number of point clouds for the identified ground is n and the number of inliers in the fitted ground model is i when the RANSAC algorithm is applied using the ground model, the loss for the ground may be calculated through the code below.

ground_loss=$i/n$

Meanwhile, compared to vertical fitting that considers only the z-axis, horizontal fitting that considers both the x-axis and y-axis may have a problem in that the loss is calculated unbalanced. This loss imbalance may make it difficult to converge to the correct answer because the calibration process searches near a local minimum rather than adjusting the ground first and moving to another position when the loss has already dropped.

Thus, the second calibration part 220 may add a loss corresponding to a ratio between the loss for the cylindrical object and the loss for the ground to the loss function.

Meanwhile, the loss corresponding to a ratio between the loss for the cylindrical object and the loss for the ground may be calculated through the code below.

double ratio_loss;
if (pole_loss>ground_loss)
ratio_loss=ground_loss/pole_loss;
else//pole_loss<ground_loss
ratio_loss=pole_loss/ground_loss;

Finally, the second calibration part 220 may configure the loss function as shown in the code below.

double lambda=0.5;

$$\text{double loss} = (-1) * \text{pole\_loss} + (-1) * \text{ground\_loss} + (-1) * \text{ratio\_loss} * \text{lambda};$$

Here, $\lambda$ of 0.5 may solve the problem of the loss going down further when the loss for the object and the loss for the ground are the same value.

Further, the second calibration part 220 may perform calibration on the point cloud data through particle swarm optimization (PSO) using the loss function.

For example, PSO may be configured through the code below.

---

Algorithm 1: Particle Swarm Optimization

Input : Objective function $f : \chi \to \mathbb{R}$,
Termination condition $\psi : \chi \to \mathbb{R}$,
Population size: N,
Lower and upper bounds of the solution: $b_{lb}$ and $b_{ub}$,
Maximum influence values $\phi_1$ and $\phi_2$
Output: Best solution g 1  // Step 1: Initialization.
2  Randomly initialize the population $\mathcal{P} = \{x_1, x_2, ..., x_N\}$.
3  Randomly initialize the particle's velocity within $[b_{lb}, b_{ub}]$.
4  repeat
5  | for $i \in \{1, 2, 3, ..., N\}$ do
6  |  | // Step 2: Velocity Calculation.
7  |  | // d is a dimensionality of the input space $\chi$.
8  |  | Generate a random vector $r_1 \sim U[0, \phi_1]^d$
9  |  | Generate a random vector $r_2 \sim U[0, \phi_2]^d$
10 |  | $v_i^{(k+1)} \leftarrow v_i^{(k)} + r_1(p_i - x_i^{(k)}) + r_2(g - x_i^{(k)})$
11 |  | // Step 3: Position Update
12 |  | $x_i^{(k+1)} \leftarrow x_i^{(k)} + v_i^{(k+1)}$
13 |  | // Step 4: Evaluation
14 |  | if $f(x_i^{(k+1)}) < f(p_i)$ then
15 |  |  | $p_i \leftarrow x_i$
16 |  |  | if $f(p_i) < f(g)$ then
17 |  |  |  | $g \leftarrow p_i$
18 |  |  | end
19 |  | end
20 | end
21 until $\psi(\chi) == \text{TRUE}$;
22 return g

---

Further, the second calibration part 220 may configure the loss function by optimizing it using the variance of the point cloud of the identified object.

Specifically, the second calibration part 220 may configure at least one identified object into an octree, and perform calibration on the point cloud data using the variance summation of each leaf node of the configured octree as a loss.

At this time, the second calibration part 220 may configure a loss function by adding the length of the z-axis of the point cloud data to the variance summation loss, and perform calibration on the point cloud data based on the loss function. Thereby, the second calibration part 220 may configure a loss function which is continuous for ground fitting and from which randomness is removed.

As the following configuration, a third calibration part 225 may perform calibration between a plurality of lidars.

First, the third calibration part 225 may acquire first point cloud data obtained from a first lidar to generate a reference map, a plurality of second point cloud data obtained from a plurality of second lidars mounted on the vehicle traveling on a path on the reference map, and specification values for the first lidar and the plurality of second lidars.

For example, the first lidar may be a lidar for generating a map, and the plurality of second lidars may be lidars mounted on the vehicle that moves a path on the map to update the generated map. Here, the plurality of second lidars may include a lidar that acquires point cloud data on the front side of the vehicle, a lidar that acquires point cloud data on the rear side of the vehicle, and a lidar that is installed on a roof of the vehicle to acquire 360-degree point cloud data.

Next, the third calibration part 225 may perform preprocessing on the first point cloud data and the plurality of second point cloud data.

Specifically, the third calibration part 225 may voxelize the first point cloud data and the plurality of second point cloud data. Thereby, the third calibration part 225 may reduce a difference in the number of points between the first lidar and one of the plurality of second lidars, and remove noise.

Further, the third calibration part 225 may perform preprocessing by calculating the average and standard deviation based on distances between points in the first point cloud data and the plurality of second point cloud data and defining a point with a deviation greater than a preset value as an outlier.

Since calibration is performed between the lidar for generating the reference map and the lidar mounted on the vehicle, point clouds corresponding to vehicles or people that do not exist on the reference map may result in calibration errors.

Accordingly, the third calibration part 225 may detect the ground from the plurality of second point cloud data and remove an object having a height of a preset value based on the detected ground. That is, the third calibration part 225 may perform preprocessing to identify and delete objects such as vehicles and people based on the height from the ground.

In addition, the fitness score used in NDT matching, which will be described later, may mean the distance average of points whose distance is less than a predetermined value after matching each point of one of the plurality of second point cloud data with the closest point in the first point cloud data. Thus, in order to reduce the error in the z-axis values of the plurality of second lidars, the specific gravity of the ground should be as large as a wall and a pillar.

Thus, the third calibration part 225 may detect the ground from the plurality of second point cloud data, approximate the point cloud detected on the ground to a plane, and then interpolate additional points between the point clouds detected on the ground.

Next, the third calibration part 225 may perform calibration on the preprocessed first point cloud data and plurality of second point cloud data.

Specifically, the third calibration part 225 may simultaneously perform calibration on a plurality of second lidars through multi-thread.

For calibration, the third calibration part 225 may perform NDT matching (normal distribution transform matching) on each of the first point cloud data and the plurality of second point cloud data. At this time, the third calibration part 225 may perform calibration by designating the specification value of each of the first lidar and the plurality of second lidars as an initial pose.

Here, NDT matching is an algorithm that calculates a transformation matrix through matching between point cloud data. When the first point cloud data and the plurality of second point cloud data each overlap, the error of each point may be minimized by calculating a normal distribution. That is, the NDT algorithm is an algorithm that matches each of the plurality of second point cloud data based on the first point cloud data. This may optimize rotation and translation values to increase the probability that each point of each of the plurality of second point cloud data is in a grid, after dividing the first point cloud data into the grid of a certain size and approximating point clouds in the grid to the normal distribution.

In the process of NDT matching, the third calibration part 225 may use the fitness score, which is a sum of errors in the average and covariance between voxels, to determine matching between the first point cloud data and the plurality of second point cloud data. Here, the fitness score may refer to the distance average of points whose distances are less than a predetermined value after matching each point of one of the plurality of second point cloud data converted to a pose as the result of NDT matching with the closest point in the first point cloud data. At this time, the third calibration part 225 may extract a pose at a point when the fitness score becomes lower than a preset value. The third calibration part 225 may verify calibration by comparing the fitness score at the time when NDT matching is completed with a preset value.

Further, the third calibration part 225 may perform NDT matching with the first point cloud data by designating a region of interest (ROI) to each of the plurality of second point cloud data. At this time, the third calibration part 225 may designate the ROI to each of the plurality of second point cloud data based on the coordinate system of the first point cloud data, and may designate the ROI after aligning the coordinate systems of the first point cloud data and the plurality of second point cloud data using the specification value of each of the plurality of second lidars. The third calibration part 225 may determine the matching between the first point cloud data and the plurality of second point cloud data using the fitness score of the designated ROI. At this time, the third calibration part 225 may extract the pose at the point when the fitness score becomes lower than the preset value. For example, the third calibration part 225 may select a region where no movement of a worker is expected as the ROI.

Here, the third calibration part 225 may perform NDT matching while changing the yaw value of each of the plurality of second point cloud data to a preset angle to extract a pose at the point where the fitness score becomes lower than the preset value, and re-input the extracted pose as the initial pose for the NDT matching.

For example, the third calibration part 225 may perform NDT matching by changing the yaw value of one of the plurality of second lidars within the range of ±3° by 0.1°, and obtain the minimum fitness score and the pose at the corresponding fitness point. At this time, the third calibration part 225 may re-input the minimum fitness score and the pose at the corresponding fitness point as the initial pose for the NDT matching, and select the pose at the corresponding point as the result when the pose converges by repeating the NDT matching.

As the following configuration, the map generation part 230 may generate a feature map by mapping the feature point of the image captured by the camera to point cloud data acquired by the lidar.

To this end, the map generation part 230 may generate a first feature map based on the point cloud data acquired by the lidar and the image captured by the camera.

Specifically, the map generation part 230 may acquire the point cloud data and the image through the lidar mounted on the vehicle and acquiring the point cloud data and the camera installed at the same position as the lidar.

The map generation part 230 may extract the feature point from the acquired image, and generate a first feature map composed of the extracted feature point. Here, the map generation part 230 may extract the feature point based on the continuity of brightness of pixels within a preset range from each pixel included in the image.

That is, the map generation part 230 may determine a specific pixel as a corner point when there are n or more consecutive pixels that are brighter than the specific pixel included in the image by a certain value or more or there are n or more consecutive pixels that are darker than the specific pixel by a certain value or more.

To this end, the map generation part 230 may determine whether there is a corner point using a decision tree. That is, the map generation part 230 may classify the brightness value of the pixel into three values when it is much darker than the specific pixel and is similar to the specific pixel, and use the values to express the brightness distribution of pixels on the circumference as a 16-dimensional ternary vector. The map generation part 230 may classify whether the corner point exists by inputting the expressed ternary vector into the decision tree.

Further, the map generation part 230 may gradually reduce and blur the image to a preset scale, extract an outline and a corner included in the image through the Difference of Gaussian (DoG) function, extract pixels for maximum and minimum values for each pixel in the image composed of the extracted outline and corner, and extract the pixels with the extracted maximum and minimum values as feature points.

The map generation part 230 may set a window centered on each pixel included in the image and detect a corner by moving the set window by a predetermined direction and distance. For example, the map generation part 230 may calculate the amount of image change when the window is moved by one pixel in the four directions, vertically, horizontally, left diagonally, and right diagonally for each pixel position, set the minimum value of the image change amount as the image change amount value of the corresponding pixel, and classify the point where the set minimum value is locally maximized as a corner point.

As a result, the map generation part 230 may generate a feature point map based on the feature point located at the detected corner among feature points extracted based on continuity of brightness. That is, the map generation part 230 may generate the first feature map composed of only the feature points extracted from the image.

Next, the map generation part 230 may generate a third feature map by mapping the first feature map to the second feature map generated through pre-stored point cloud data.

Specifically, the map generation part 230 may map the first feature map to the second feature map based on the position information and pose information of the point cloud data acquired simultaneously with the image for generating the first feature map.

Meanwhile, the second feature map may be a point cloud map created using equipment for acquiring the image and point cloud data for generating the first feature map, and point cloud data acquired by the same equipment.

Thus, the map generation part 230 may omit a pose optimization process when mapping the first feature map to the second feature map. Thereby, the map generation part 230 may not only generate a lightweight feature map created only with the feature points, but also generate the third feature map at high speed.

Further, the map generation part 230 may receive at least one image for position estimation in real time after generating the third feature map.

The map generation part 230 may analyze at least one received image in real time to extract the feature point. Here, the map generation part 230 may extract the feature point from the image in the same manner as the method of extracting the feature point to generate the first feature map described above.

Further, the map generation part 230 may match the extracted feature point with the third feature map to estimate a position on the image received in real time. At this time, the map generation part 230 may estimate the pose of the camera of the data collector based on information about the feature point of at least one image received in real time and the feature point of the third feature map. For example, the map generation part 230 may calculate a current position and pose on the image through a pnpsolver function. That is, the map generation part 230 may estimate the position and pose of the camera photographing the image received in real time based on the feature points of the image received in real time and the feature point on the third feature map.

When the map generation part 230 fails to estimate the position of a first image among at least one image, it may estimate the position of the first image based on the pose of the second image, which is an image that successfully estimated the previous position. That is, the map generation part 230 may predict the position of the image that failed to estimate the position based on the position and pose of the previously captured image.

Meanwhile, at least one image received in real time may be an image captured by a terminal equipped with the camera and the IMU.

At this time, the map generation part 230 estimates the position of the first image by reflecting the pose measured by the IMU based on the pose of the second image, thereby increasing the accuracy of the position and pose estimation for the image that failed to estimate the position.

Figure 3:
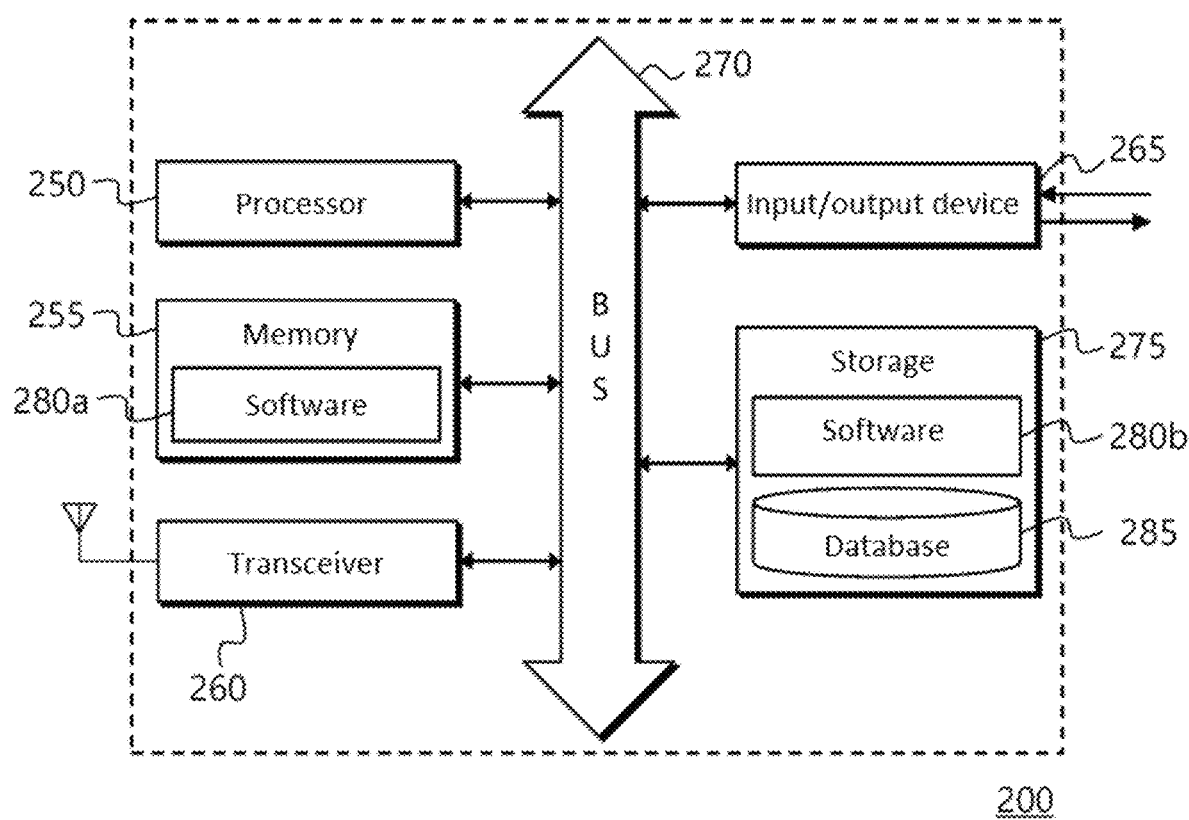
FIG. 3 is a hardware configuration diagram of the data generator according to an embodiment of the present disclosure.

FIG. 3 is a hardware configuration diagram of the data generator according to an embodiment of the present disclosure.

Referring to FIG. 3, the data generator 200 may include a processor 250, a memory 255, a transceiver 260, an input/output device 265, a data bus 270, and a storage 275.

The processor 250 may implement the operation and function of the data generator 200 based on an instruction according to software 280*a* loaded in the memory 255. The software 280*a* implementing the method according to the present disclosure may be loaded in the memory 255. The transceiver 260 may transmit and receive data to and from the data collector 100 and the data processor 300.

The input/output device 265 may receive data required for the operation of the data generator 200 and output the generated result value. The data bus 270 may be connected to the processor 250, the memory 255, the transceiver 260, the input/output device 265, and the storage 275, and serve as a moving path for transferring data between components.

The storage 275 may store an application programming interface (API), a library file, a resource file, etc. required to execute the software 280a in which a method according to the present disclosure is implemented. The storage 275 may store software 280b in which the method according to the present disclosure is implemented. Further, the storage 275 may store information necessary to perform the calibration method and the map generation method. In particular, the storage 275 may include a database 285 to store a program for executing the calibration method and the map generation method.

According to an embodiment of the present disclosure, the software 280a and 280b loaded in the memory 255 or stored in the storage 275 may be a computer program recorded on a recording medium so as to execute a step in which the processor 250 extracts the calibration board from each of the images captured by the camera and the point cloud data acquired by the lidar, a step in which the processor 250 identifies the feature point of the calibration board included in each of the images and point cloud data, and a step in which the processor 250 performs the calibration of the camera and lidar based on the identified feature point.

According to another embodiment of the present disclosure, the software 280a and 280b loaded in the memory 255 or stored in the storage 275 may be a computer program recorded on the recording medium so as to execute a step in which the processor 250 places the point cloud data, acquired from the lidar mounted on the vehicle, on the predefined world coordinate system, a step in which the processor 250 extracts a region that is to be used for calibration among the placed point cloud data, a step in which the processor 250 identifies at least one object included in the extracted region, and a step in which the processor 250 performs calibration on the point cloud data by fitting the point cloud included in at least one identified object to the pre-stored model.

According to another embodiment of the present disclosure, the software 280a and 280b loaded in the memory 255 or stored in the storage 275 may be a computer program recorded on the recording medium so as to execute a step in which the processor 250 acquires the first point cloud data obtained from the first lidar to generate the reference map, the plurality of second point cloud data obtained from the plurality of second lidars mounted on the vehicle traveling on the path on the reference map, and the specification values for the first lidar and the plurality of second lidars, a step in which the processor 250 performs preprocessing on the first point cloud data and the plurality of second point cloud data, and a step in which the processor 250 performs calibration on the preprocessed first point cloud data and the plurality of second point cloud data.

According to a further embodiment of the present disclosure, the software 280a and 280b loaded in the memory 255 or stored in the storage 275 may be a computer program recorded on the recording medium so as to execute a step in which the processor 250 generates the first feature map based on the point cloud data acquired by the lidar and the image captured by the camera, and a step in which the processor 250 generates the third feature map by mapping the first feature map to the second feature map generated through pre-stored point cloud data.

To be more specific, the processor 250 may include an Application-Specific Integrated Circuit (ASIC), other chipsets, a logic circuit, and/or a data processing device. The memory 255 may include a Read-Only Memory (ROM), a Random Access Memory (RAM), a flash memory, a memory card, a storage medium, and/or other storage devices. The transceiver 260 may include a baseband circuit for processing wired and wireless signals. The input/output device 265 may include an input device such as a keyboard, a mouse, and/or a joystick, an image output device such as a Liquid Crystal Display (LCD), an Organic LED (OLED), and/or an Active Matrix OLED (AMOLED), and a printing device such as a printer or a plotter.

When an embodiment included herein is implemented as software, the above-described method may be implemented as a module (process, function, etc.) that performs the above-described function. The module may be loaded in the memory 255, and be executed by the processor 250. The memory 255 may be internal or external to the processor 250, and may be connected to the processor 250 via a variety of well-known means.

Each component shown in FIG. 3 may be implemented by various means, e.g., hardware, firmware, software, or a combination thereof. In the case of implementation by hardware, an embodiment of the present disclosure may be implemented by one or more ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, microcontrollers, microprocessors, and the like.

Further, in the case of implementation by firmware or software, an embodiment of the present disclosure may be implemented in the form of a module, procedure, function, etc. that performs the functions or operations described above, and may be recorded on the recording medium readable through various computer means. Here, the recording medium may include program instructions, data files, data structures, etc., alone or in combination. The program instructions recorded on the recording medium may be instructions that are especially designed and constructed for the present disclosure, or may be known and available to those skilled in the art of computer software. For instance, the recording medium includes magnetic media such as hard disks, floppy disks and magnetic tapes, optical media such as CD-ROM (Compact Disk Read Only Memory) and DVD (Digital Video Disk), magneto-optical media such as floptical disks, and hardware devices specially configured to store and execute program instructions such as ROM, RAM, flash memory, etc. Examples of program instructions may include machine language code such as that created by a compiler as well as high-level language code that may be executed by a computer using an interpreter, etc. Such a hardware device may be configured to operate as one or more software so as to perform the operation of the present disclosure, and vice versa.

Figure 4:
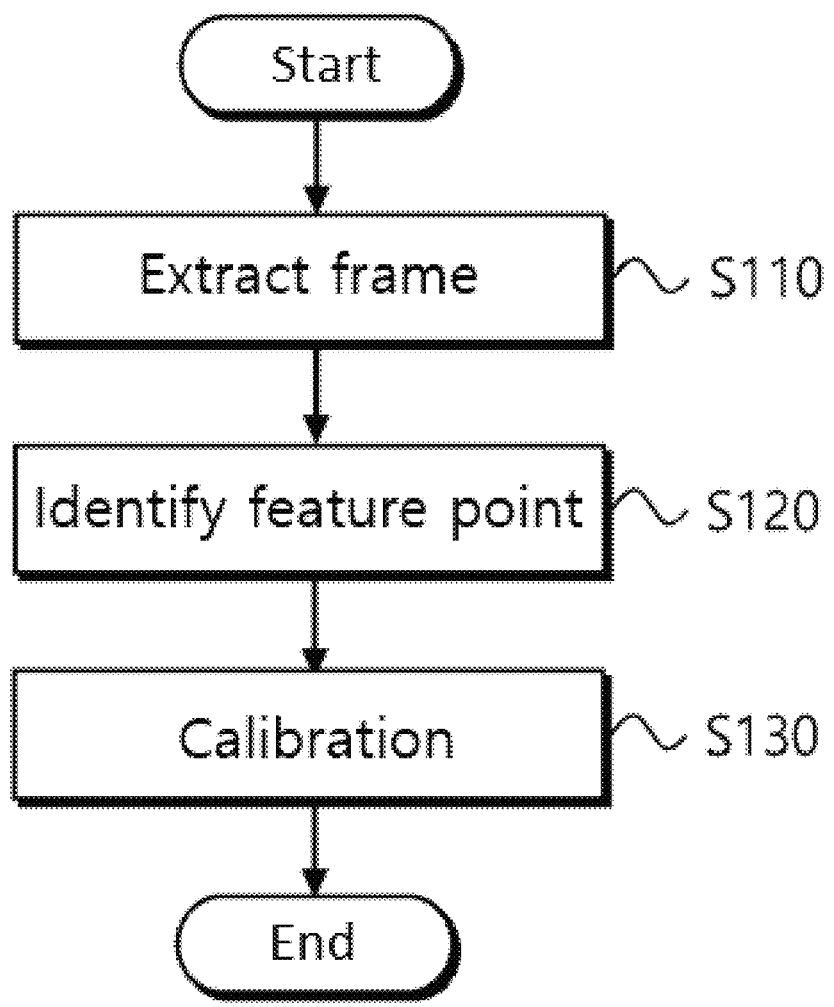
FIG. 4 is a flowchart illustrating a calibration method of a camera and a lidar according to an embodiment of the present disclosure.

FIG. 4 is a flowchart illustrating a calibration method of a camera and a lidar according to an embodiment of the present disclosure.

Referring to FIG. 4, first, in step S110, the data generator may extract one frame for each of the images captured by the camera and the point cloud data acquired by the lidar. At this time, each frame for the extracted image and lidar may include a calibration board.

Next, in step S120, the data generator may identify the feature point on the calibration board included in one frame for each extracted image and lidar.

Here, the calibration board is a rectangular checker board, and may include a border identification region that is formed at a border thereof and is formed of a material with an intensity higher than a preset value, and a top point identification region that is located on the top of the border identification region and is formed of a material with an intensity lower than a preset value.

Specifically, the data generator may identify a corner based on the size and number of calibration boards in the image captured by the camera.

At this time, the data generator may identify a point corresponding to the corner using a preset pattern based on the feature point located on the top or bottom of the calibration board, and then assign an index.

Further, the data generator may detect the calibration board from the point cloud data based on the border identification region with a relatively high intensity on the calibration board, and identify the feature point within the detected calibration board.

Specifically, the data generator may generate a virtual plane based on the point cloud included in the border identification region, and connect the outermost points for each channel in the generated virtual plane to generate a plurality of straight lines. Further, the data generator may detect the vertices of the calibration board based on the intersection of the plurality of generated straight lines, and identify the feature point of the calibration board based on the detected vertices.

That is, the data generator may identify four vertices included in the calibration board, and identify the feature point of the calibration board based on the pre-stored size and number of calibration boards. Here, the feature point of the calibration board identified in the point cloud data may correspond to the feature point identified in the image.

In this regard, the data generator may match the index of the feature point identified from the previously identified image with the feature point identified from the lidar, based on the top point identification region of the calibration board.

Further, in step S130, the data generator may perform calibration of the camera and lidar based on the feature point identified from each of the images and point cloud data.

Specifically, the data generator may calculate external parameters including a rotation value and a translation value based on the feature point of the calibration board included in each of the images and point cloud data, and perform calibration based on the calculated external parameters.

In this case, the data generator may individually calculate the rotation value and the translation value. Preferably, the data generator may calculate the rotation value, and then calculate the translation value.

First, the rotation value may be calculated through the following Equation when defined as the rotation value from the first view point to the second view point.

$$|(f_1 * Rf'_1)(f_2 * Rf'2)(f_3 * Rf'_3)| = 0 \quad \text{[Equation]}$$

(Here, R represents the rotation value, and f and f' represent the ray from the first view point and the second view point to the feature point of the calibration board included in the point cloud data.)

The translation value may be calculated through a loss function based on RPE (Re-Projection Error). Here, RPE may refer to a degree to which a point observed in the image is projected onto the image and distorted.

Figure 5:
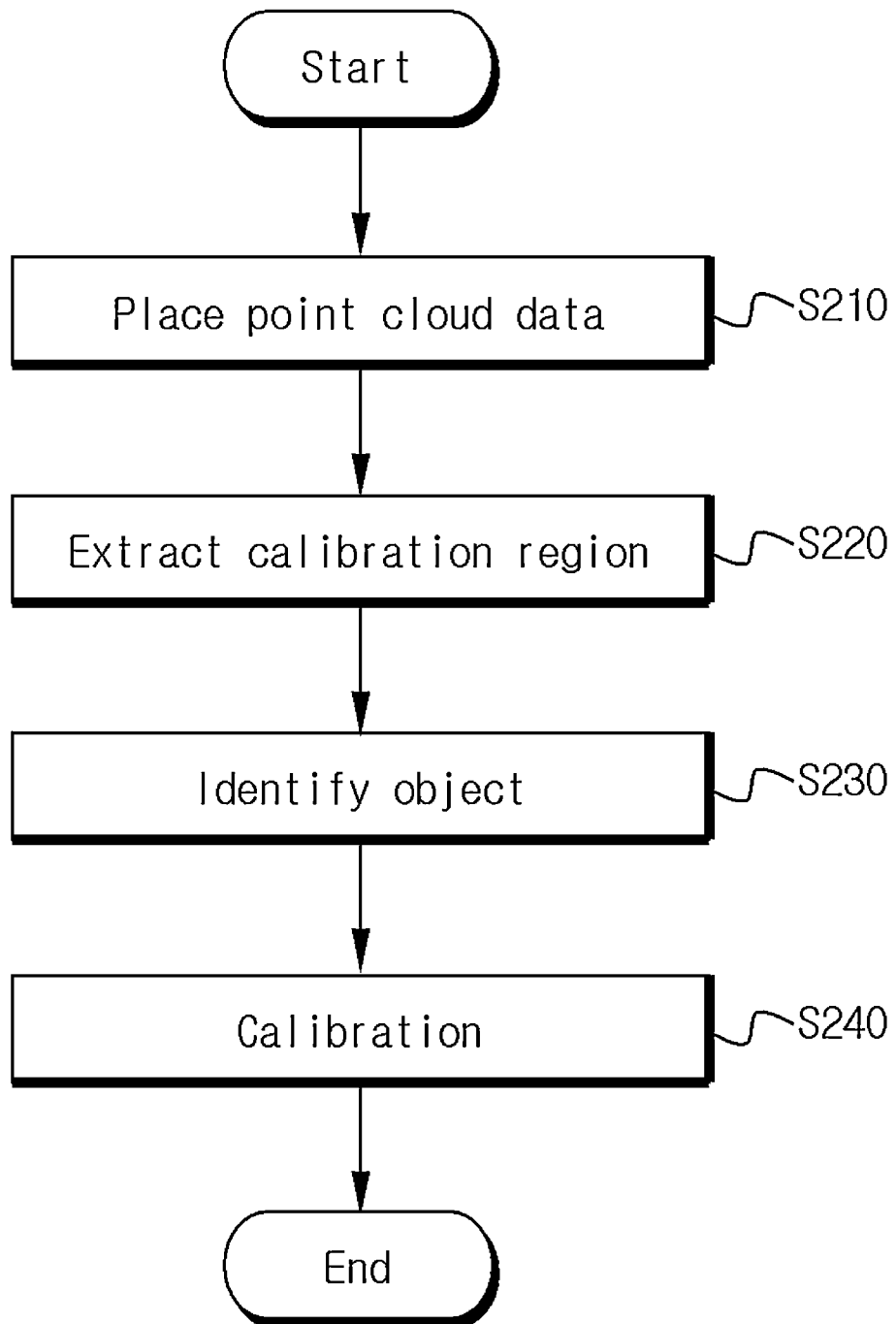
FIG. 5 is a flowchart illustrating a calibration method of a lidar and an IMU according to an embodiment of the present disclosure.

FIG. 5 is a flowchart illustrating a calibration method of a lidar and an IMU according to an embodiment of the present disclosure.

Referring to FIG. 5, first, in step S210, the data generator may place point cloud data obtained from the lidar mounted on the vehicle on a predefined world coordinate system.

In this case, the data generator may define the world coordinate system through position information measured from at least one of the Global Positioning System (GPS) and the Inertial Measurement Unit (IMU) acquired simultaneously with the point cloud data.

Next, in step S220, the data generator may extract a region that is to be used for calibration from the placed point cloud data.

Specifically, the data generator may extract a trajectory in which a heading standard deviation indicating the error in GPS data among movement paths of the vehicle equipped with the lidar is lower than a preset value, and extract a section within the extracted trajectory in which vehicles travel in opposite directions.

Next, in step S230, the data generator may identify at least one object included in the extracted region.

Specifically, the data generator may identify the cylindrical object for horizontal fitting among the placed point cloud data. For example, the cylindrical object may include a streetlight, a utility pole, a traffic light, etc.

Further, the data generator may identify the ground for vertical fitting among the placed point cloud data. At this time, the data generator may extract a region of a preset size based on the midpoint of an extracted section and perceive it as the ground.

Next, in step S230, the data generator may perform calibration on the point cloud data by fitting the point cloud included in at least one identified object into a pre-stored model.

Specifically, the data generator may calculate a value, obtained by dividing the number of inlier point clouds fitted to a pre-stored cylinder model corresponding to the cylindrical object by the number of point clouds included in the cylindrical object, as a loss for the cylindrical object.

Further, the data generator may calculate a value, obtained by dividing the number of inlier point clouds fitted to the pre-stored ground model corresponding to the ground by the number of point clouds included in the ground, as the loss for the ground.

The data generator may perform calibration on the point cloud data using a loss function based on the loss for the cylindrical object and the loss for the ground.

That is, the data generator may configure the loss function as shown in the code below.

$$\text{double loss} = (-1) * \text{pole\_loss} + (-1) * \text{ground\_loss}$$

(Here, pole_loss represents a loss for the object, and ground_loss represents a loss for the ground.)

Here, assuming that the number of point clouds for the identified object is n and the number of inliers in the fitted cylinder model is i when the RANSAC algorithm is applied using the cylinder model, the loss for the object may be calculated through the code below.

pole_loss=i/n

Further, assuming that the number of point clouds for the identified ground is n and the number of inliers in the fitted ground model is i when the RANSAC algorithm is applied using the ground model, the loss for the ground may be calculated through the code below.

ground_loss=i/n

Meanwhile, compared to vertical fitting that considers only the z-axis, horizontal fitting that considers both the x-axis and y-axis may have a problem in that the loss is calculated unbalanced. This loss imbalance may make it difficult to converge to the correct answer because the calibration process searches near a local minimum rather than adjusting the ground first and moving to another position when the loss has already dropped.

Thus, the data generator may add a loss corresponding to a ratio between the loss for the cylindrical object and the loss for the ground to the loss function.

Meanwhile, the loss corresponding to a ratio between the loss for the cylindrical object and the loss for the ground may be calculated through the code below.

double ratio_loss;
if (pole_loss>ground_loss)
ratio_loss=ground_loss/pole_loss;
else//pole_loss<ground_loss
ratio_loss=pole_loss/ground_loss;

Finally, the data generator may configure the loss function as shown in the code below. double lambda=0.5;

$$\text{double loss} = (-1)*\text{pole\_loss} + (-1)*\text{ground\_loss} + (-1)*\text{ratio\_loss}*\text{lambda};$$

Here, λ of 0.5 may solve the problem of the loss going down further when the loss for the object and the loss for the ground are the same value.

Further, in step S240, the data generator may perform calibration on the point cloud data through particle swarm optimization (PSO) using the loss function.

Further, the data generator may configure the loss function by optimizing it using the variance of the point cloud of the identified object.

Specifically, the data generator may configure at least one identified object into an octree, and perform calibration on the point cloud data using the variance summation of each leaf node of the configured octree as a loss.

At this time, the data generator may configure a loss function by adding the length of the z-axis of the point cloud data to the variance summation loss, and perform calibration on the point cloud data based on the loss function. Thereby, the second calibration part 220 may configure a loss function which is continuous for ground fitting and from which randomness is removed.

Figure 6:
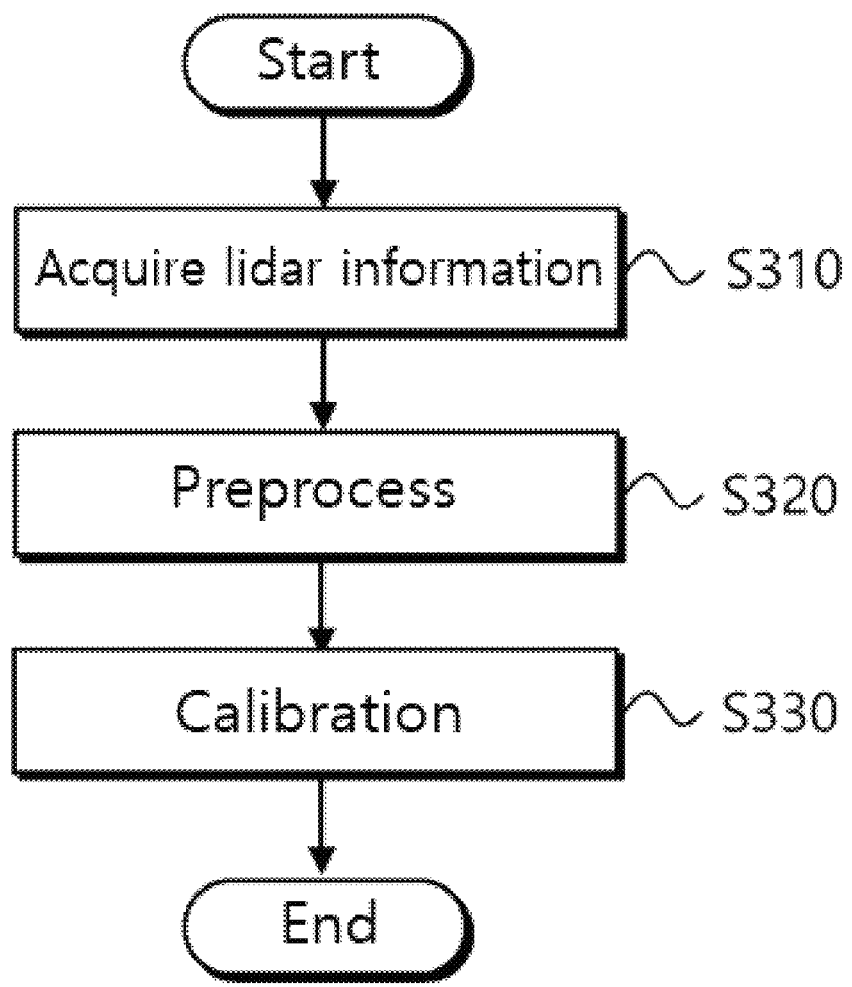
FIG. 6 is a flowchart illustrating a calibration method of a plurality of lidars according to an embodiment of the present disclosure.

FIG. 6 is a flowchart illustrating a calibration method of a plurality of lidars according to an embodiment of the present disclosure.

Referring to FIG. 6, first, in step S310, the data generator may acquire first point cloud data obtained from a first lidar to generate a reference map, a plurality of second point cloud data obtained from a plurality of second lidars mounted on the vehicle traveling on a path on the reference map, and specification values for the first lidar and the plurality of second lidars.

Next, in step S320, the data generator may perform preprocessing on the first point cloud data and the plurality of second point cloud data.

Specifically, the data generator may voxelize the first point cloud data and the plurality of second point cloud data. Thereby, the third calibration part 225 may reduce a difference in the number of points between the first lidar and one of the plurality of second lidars, and remove noise.

Further, the data generator may perform preprocessing by calculating the average and standard deviation based on distances between points in the first point cloud data and the plurality of second point cloud data and defining a point with a deviation greater than a preset value as an outlier.

Further, the data generator may detect the ground from the plurality of second point cloud data and remove an object having a height of a preset value based on the detected ground. That is, the data generator may perform preprocessing to identify and delete objects such as vehicles and people based on the height from the ground.

The data generator may detect the ground from the plurality of second point cloud data, approximate the point cloud detected on the ground to a plane, and then interpolate additional points between the point clouds detected on the ground.

Next, in step S330, the data generator may perform calibration on the preprocessed first point cloud data and plurality of second point cloud data.

Specifically, the data generator may simultaneously perform calibration on a plurality of second lidars through multi-thread.

For calibration, the data generator may perform NDT matching (normal distribution transform matching) on each of the first point cloud data and the plurality of second point cloud data. At this time, the data generator may perform calibration by designating the specification value of each of the first lidar and the plurality of second lidars as an initial pose.

In the process of NDT matching, the data generator may use the fitness score, which is a sum of errors in the average and covariance between voxels, to determine matching between the first point cloud data and the plurality of second point cloud data. In this case, the data generator may extract a pose at a point when the fitness score becomes lower than a preset value. The data generator may verify calibration by comparing the fitness score at the time when NDT matching is completed with a preset value.

Further, the data generator may perform NDT matching with the first point cloud data by designating a region of interest (ROI) to each of the plurality of second point cloud data. At this time, the data generator may designate the ROI to each of the plurality of second point cloud data based on the coordinate system of the first point cloud data, and may designate the ROI after aligning the coordinate systems of the first point cloud data and the plurality of second point cloud data using the specification value of each of the plurality of second lidars. The data generator may determine the matching between the first point cloud data and the plurality of second point cloud data using the fitness score of the designated ROI. At this time, the data generator may extract the pose at the point when the fitness score becomes lower than the preset value.

Here, the data generator may perform NDT matching while changing the yaw value of each of the plurality of second point cloud data to a preset angle to extract a pose at the point where the fitness score becomes lower than the preset value, and re-input the extracted pose as the initial pose for the NDT matching.

Figure 7:
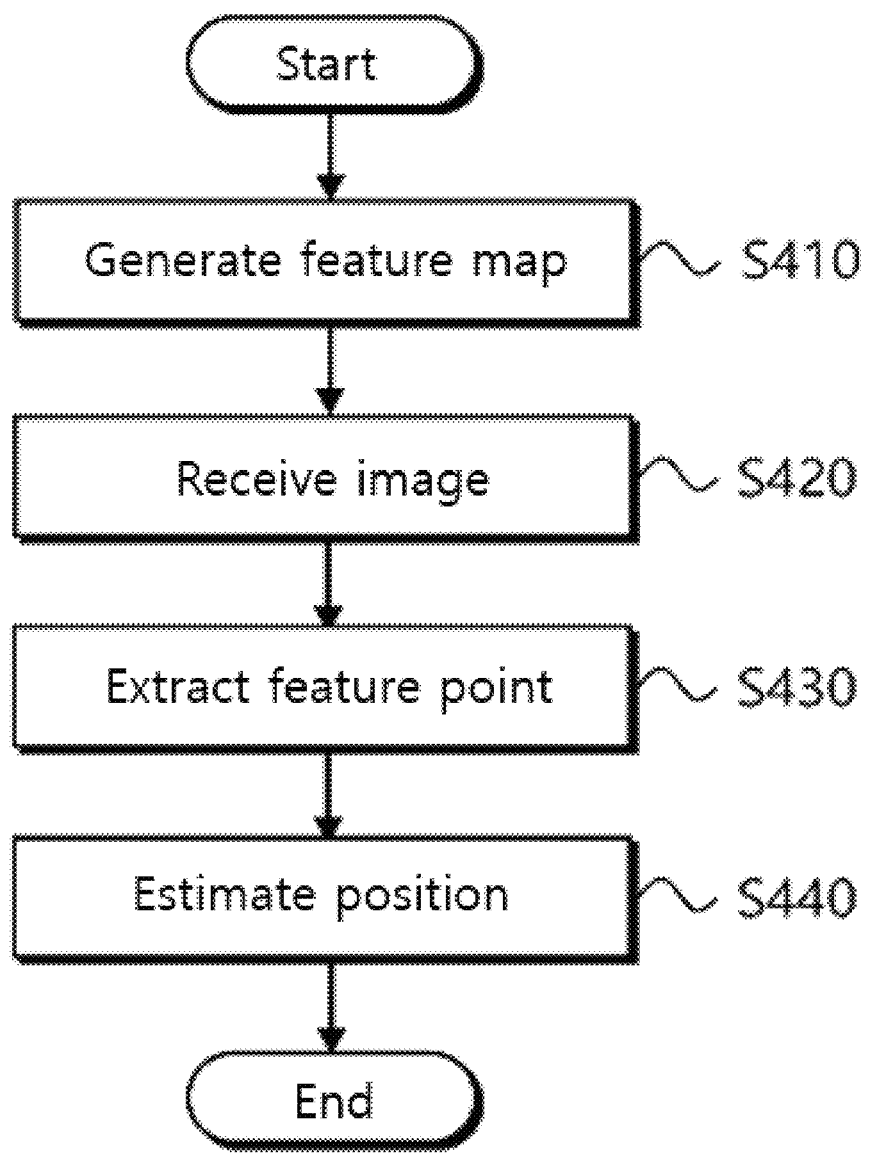
FIG. 7 is a flowchart illustrating a visual mapping method according to an embodiment of the present disclosure.

FIG. 7 is a flowchart illustrating a visual mapping method according to an embodiment of the present disclosure.

Referring to FIG. 7, first, in step S410, the data generator may generate a feature map by mapping the feature point of the image captured by the camera to point cloud data acquired by the lidar.

To this end, the data generator may generate a first feature map based on the point cloud data acquired by the lidar and the image captured by the camera.

Specifically, the data generator may acquire the point cloud data and the image through the lidar mounted on the vehicle and acquiring the point cloud data and the camera installed at the same position as the lidar.

The data generator may extract the feature point from the acquired image, and generate the first feature map composed of the extracted feature point. Here, the data generator may extract the feature point based on the continuity of brightness of pixels within a preset range from each pixel included in the image.

That is, the data generator may determine a specific pixel as a corner point when there are n or more consecutive pixels that are brighter than the specific pixel included in the image by a certain value or more or there are n or more consecutive pixels that are darker than the specific pixel by a certain value or more.

To this end, the data generator may determine whether there is a corner point using a decision tree. That is, the data generator may classify the brightness value of the pixel into three values when it is much darker than the specific pixel and is similar to the specific pixel, and use the values to express the brightness distribution of pixels on the circumference as a 16-dimensional ternary vector. The data generator may classify whether the corner point exists by inputting the expressed ternary vector into the decision tree.

Further, the data generator may gradually reduce and blur the image to a preset scale, extract an outline and a corner included in the image through the Difference of Gaussian (DoG) function, extract pixels for maximum and minimum values for each pixel in the image composed of the extracted outline and corner, and extract the pixels with the extracted maximum and minimum values as feature points.

The data generator may set a window centered on each pixel included in the image and detect a corner by moving the set window by a predetermined direction and distance.

As a result, the data generator may generate a feature point map based on the feature point located at the detected corner among feature points extracted based on continuity of brightness. That is, the data generator may generate the first feature map composed of only the feature points extracted from the image.

Next, the data generator may generate a third feature map by mapping the first feature map to the second feature map generated through pre-stored point cloud data.

Specifically, the data generator may map the first feature map to the second feature map based on the position information and pose information of the point cloud data acquired simultaneously with the image for generating the first feature map.

Meanwhile, the second feature map may be a point cloud map created using equipment for acquiring the image and point cloud data for generating the first feature map, and point cloud data acquired by the same equipment.

Thus, the data generator may omit a pose optimization process when mapping the first feature map to the second feature map. Thereby, the data generator may not only generate a lightweight feature map created only with the feature points, but also generate the third feature map at high speed.

Next, in step S420, the data generator may receive at least one image for position estimation in real time after generating the third feature map.

Subsequently, in step S430, the data generator may analyze at least one received image in real time to extract the feature point. Here, the data generator may extract the feature point from the image in the same manner as the method of extracting the feature point to generate the first feature map described above.

Further, in step S440, the data generator may match the extracted feature point with the third feature map to estimate a position on the image received in real time. At this time, the data generator may estimate the pose of the camera of the data collector based on information about the feature point of at least one image received in real time and the feature point of the third feature map.

When the data generator fails to estimate the position of a first image among at least one image, it may estimate the position of the first image based on the pose of the second image, which is an image that successfully estimated the previous position. That is, the data generator may predict the position of the image that failed to estimate the position based on the position and pose of the previously captured image.

Meanwhile, at least one image received in real time may be an image captured by a terminal equipped with the camera and the IMU.

At this time, the data generator estimates the position of the first image by reflecting the pose measured by the IMU based on the pose of the second image, thereby increasing the accuracy of the position and pose estimation for the image that failed to estimate the position.

FIGS. 8 to 11 are diagrams illustrating a calibration method of a camera and a lidar according to an embodiment of the present disclosure.

Figure 8:
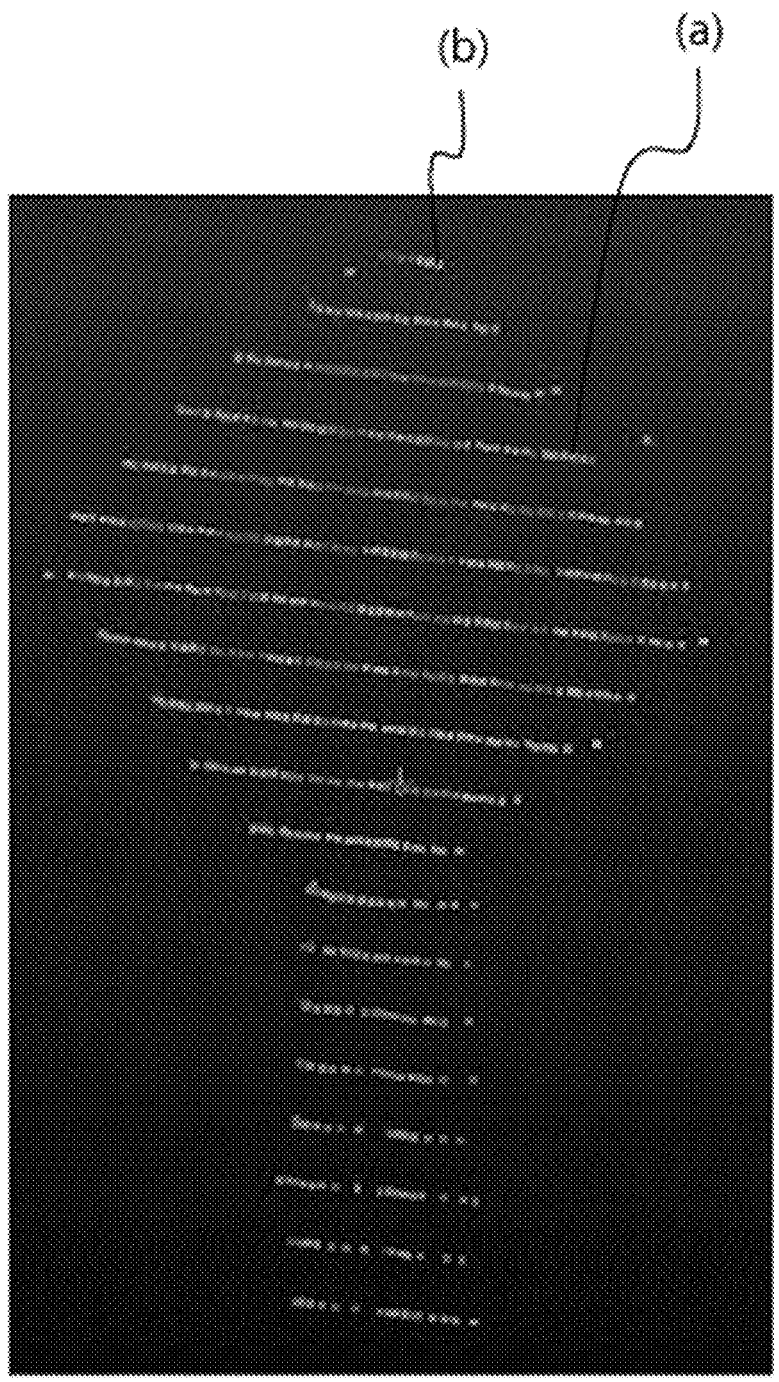
FIGS. 8 to 11 are diagrams illustrating a calibration method of a camera and a lidar according to an embodiment of the present disclosure.

As shown in FIG. 8, the calibration board may include a border identification region (a) that is formed at a border thereof and is formed of a material with an intensity higher than a preset value, and a top point identification region (b) that is located on the top of the border identification region (a) and is formed of a material with an intensity lower than a preset value.

For example, the calibration board may have a high-brightness tape formed of a material with an intensity higher than a preset value and attached along the edge of the checker board to form the border identification region (a). At this time, a portion of the high-brightness tape located on the top of the calibration board may be removed to form the top point identification region (b).

Although all points on the outer edge of the calibration board included in the point cloud data are on the same plane, the points do not actually lie exactly on one plane due to the noise from the lidar.

Figure 9:
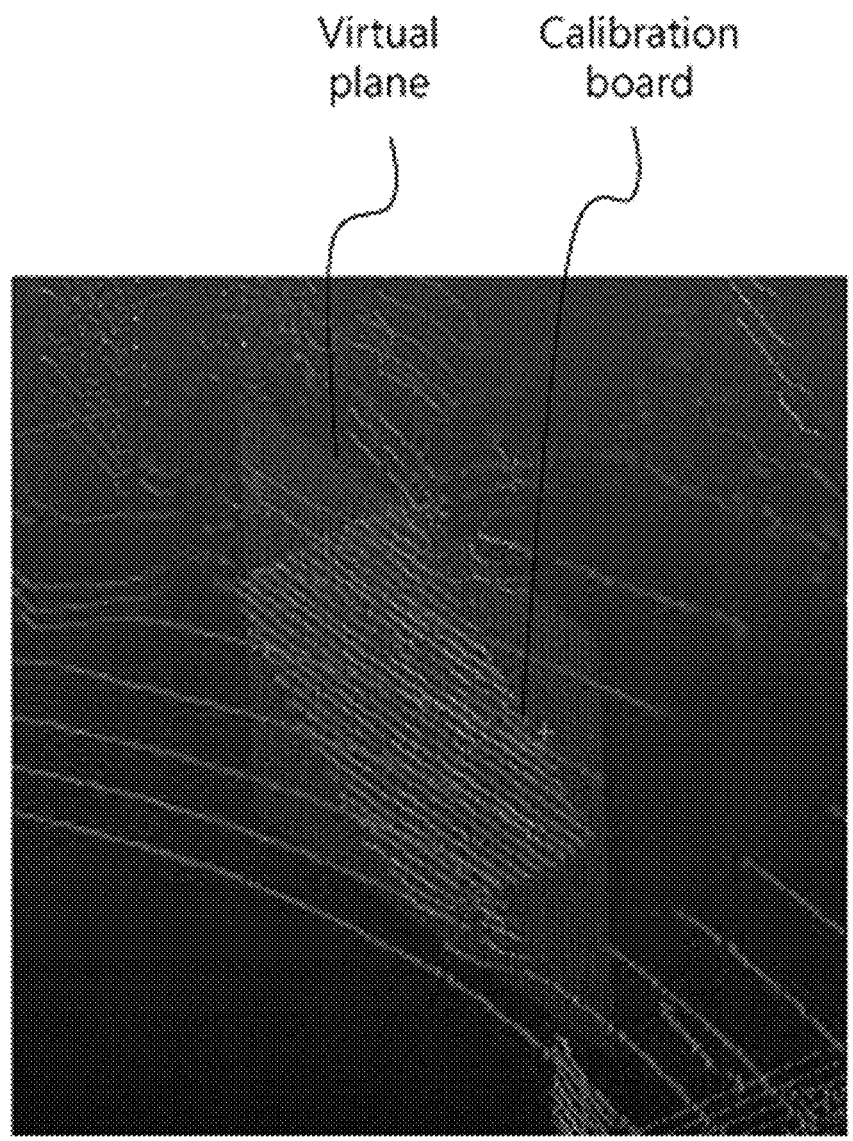

Thus, as shown in FIG. 9, the data generator may generate a virtual plane based on the point cloud included in the border identification region, so as to extract the feature point from the point cloud data acquired by the lidar.

Figure 10:
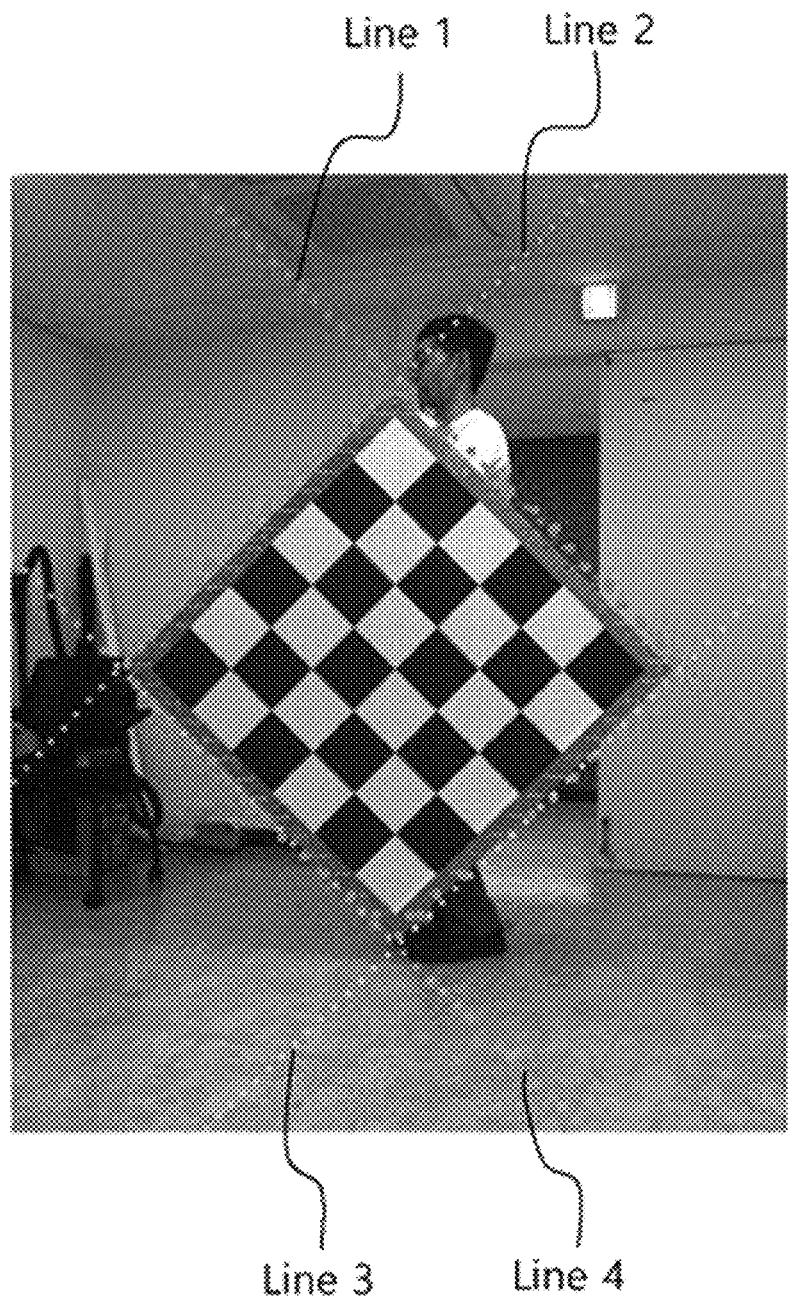

Subsequently, as shown in FIG. 10, the data generator may generate a plurality of straight lines by connecting the outermost points for each channel in the generated virtual plane to each other. That is, the data generator may obtain four straight lines (line 1, line 2, line 3, and line 4) by connecting the outermost points for each channel of the lidar.

Figure 11:
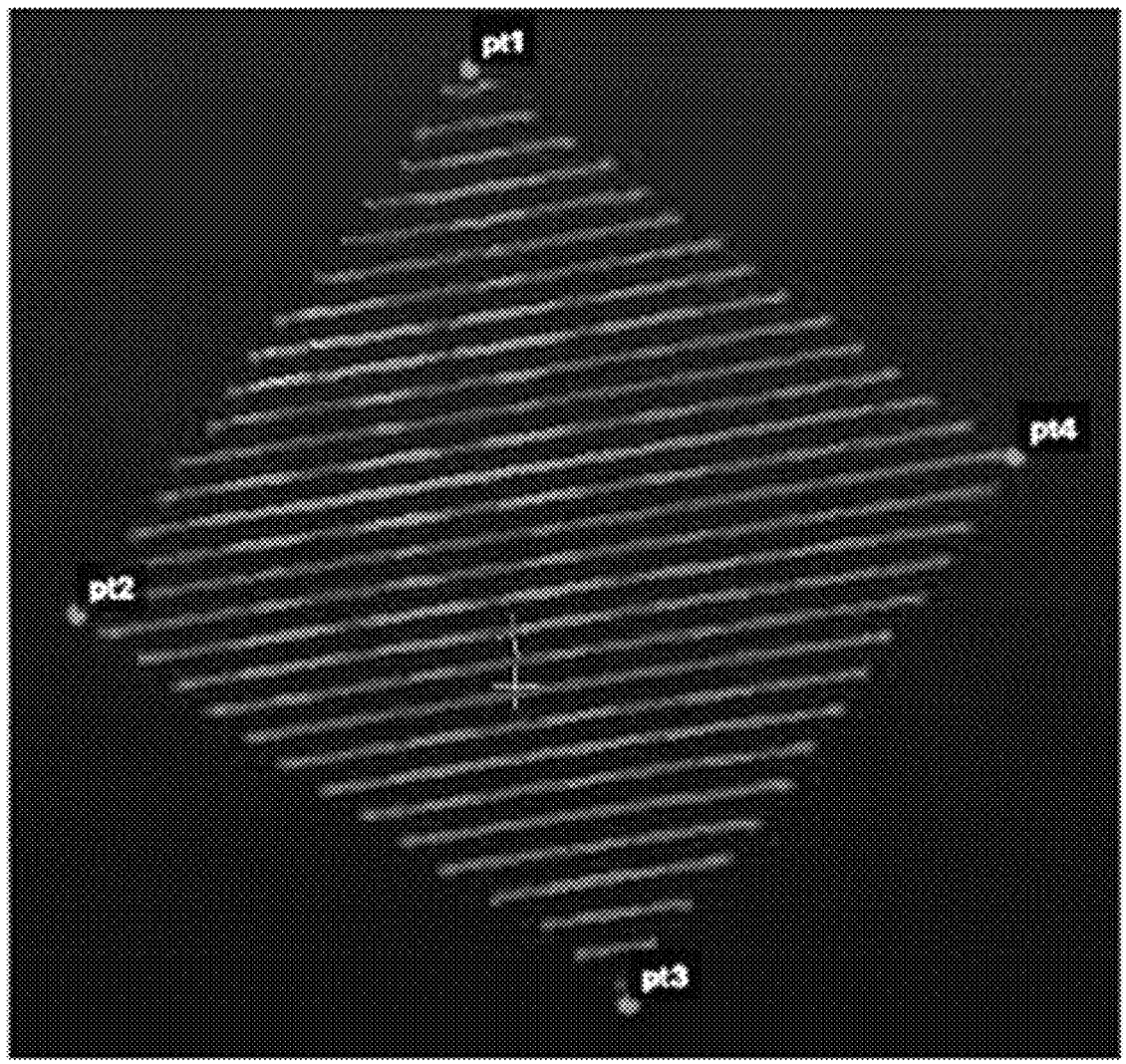

As shown in FIG. 11, the data generator detects vertices pt1, pt2, pt3, and pt4 of the calibration board based on the intersection of the plurality of generated straight lines, and identifies the feature point of the calibration board based on the detected vertices.

That is, the data generator may identify four vertices included in the calibration board, and identify the feature point of the calibration board based on the pre-stored size and number of calibration boards.

Figure 12:
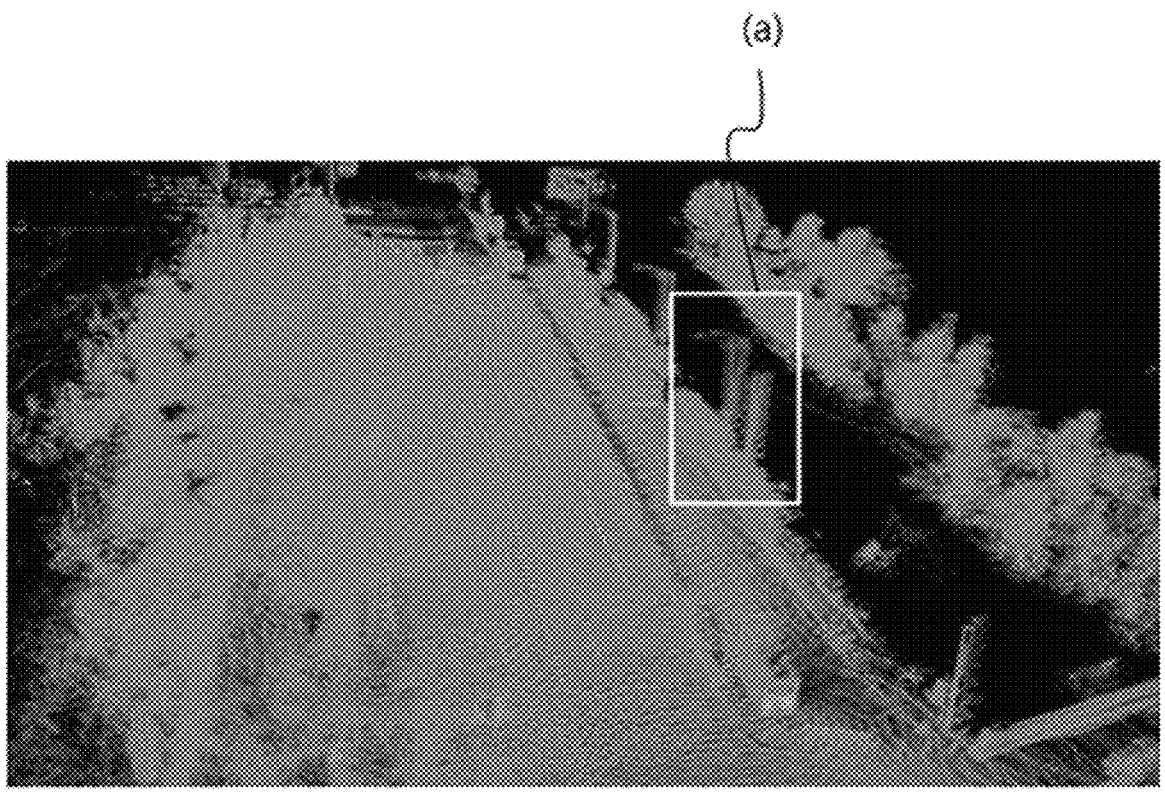
FIGS. 12 and 13 are diagrams illustrating a calibration method of a lidar and an IMU according to an embodiment of the present disclosure.
Figure 13:
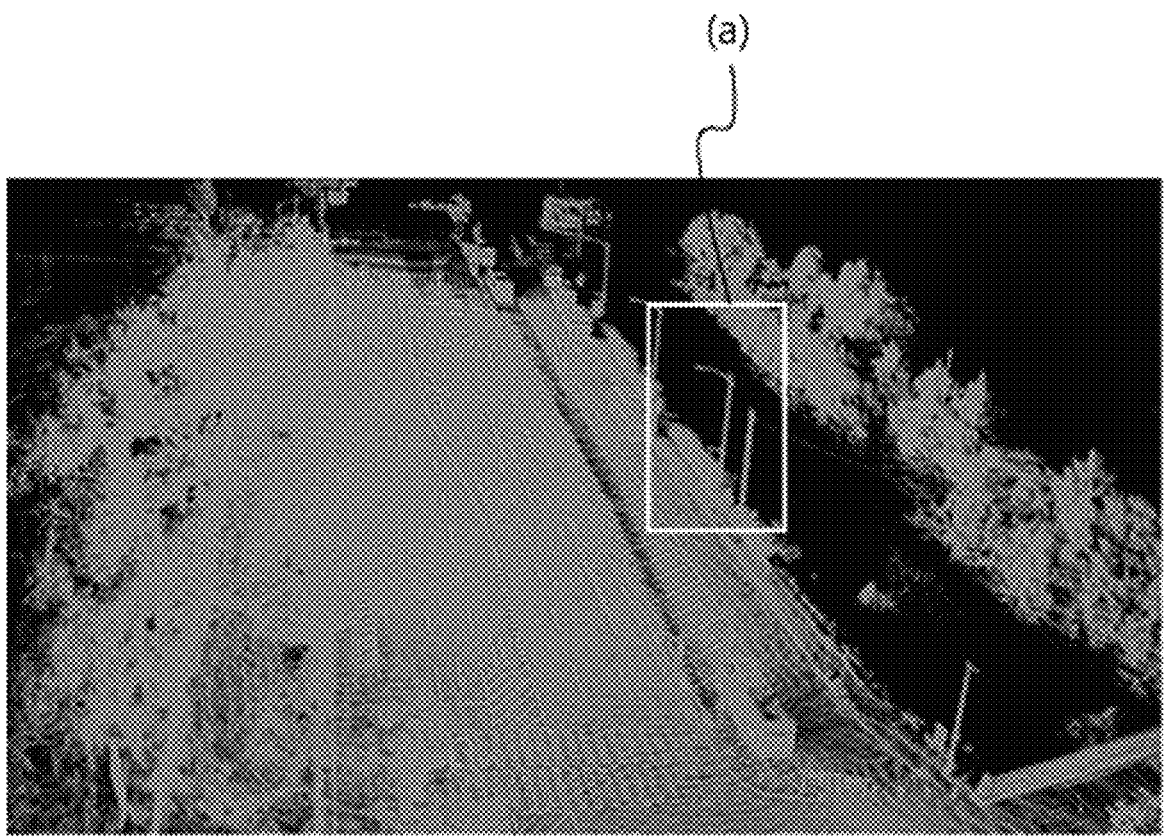

FIGS. 12 and 13 are flowcharts illustrating a calibration method of a lidar and an IMU according to an embodiment of the present disclosure.

Generally, a worker manually performs calibration between the lidar and the IMU using a specific tool.

In the case of the lidar and the camera, the lidar is overlaid on a 2D image, so the worker may intuitively check in which direction the lidar points move when changing the rotation value.

On the other hand, in the case of the lidar and the IMU, the results should be checked in three dimensions. Therefore, for manual operation, the only available method is to change the direction of the map, enlarge the map, and check the map. Further, when changing the rotation value, it is not easy to perceive how the map using the changed rotation value will change.

Further, in the case of the lidar and the IMU, there are sections with severe errors as shown in FIG. 12(a). Therefore, an exact answer may not be given, so a worker should determine the degree of calibration.

Thus, as shown in FIG. 13(a), the data generator may perform the calibration of the lidar and the IMU using the characteristics according to the shape of the specific object included in the point cloud data acquired by the lidar.

Figure 14:
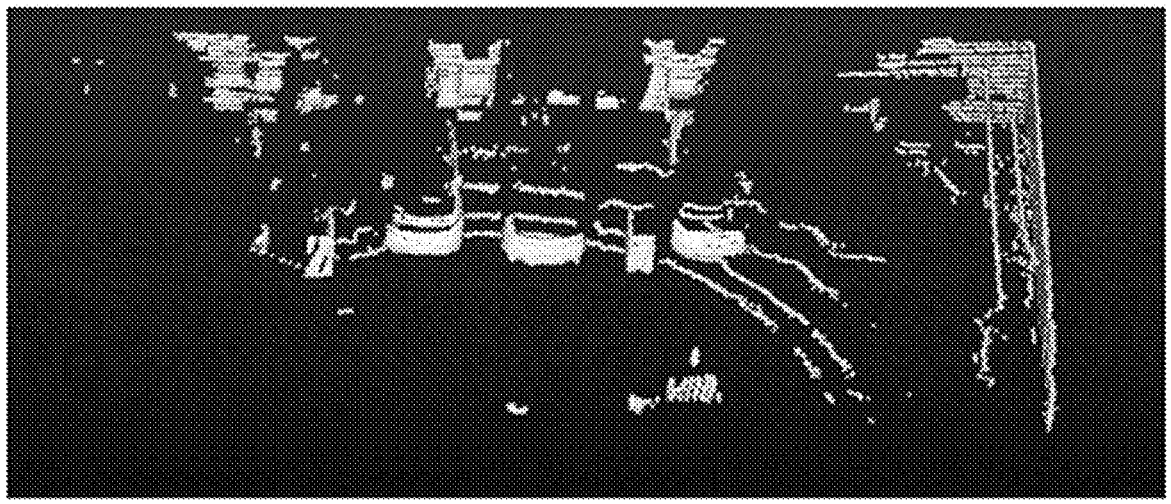
FIGS. 14 and 15 are diagrams illustrating a calibration method of a plurality of lidars according to an embodiment of the present disclosure.
Figure 15:
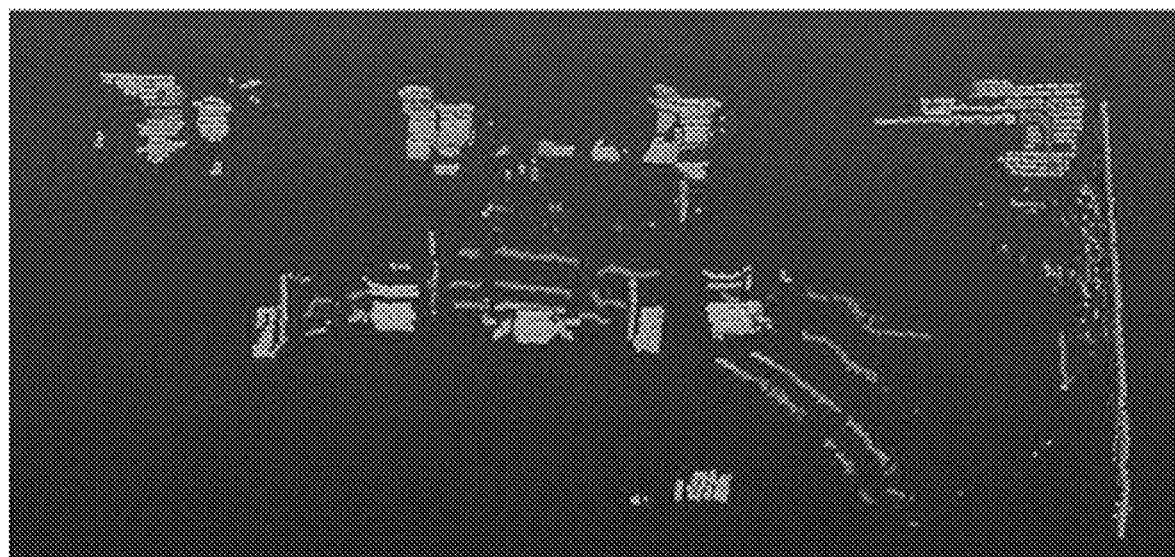

FIGS. 14 and 15 are diagrams illustrating a calibration method of a plurality of lidars according to an embodiment of the present disclosure.

Meanwhile, FIG. 14 is a diagram illustrating second point cloud data before preprocessing, and FIG. 15 is a diagram illustrating the second point cloud data after preprocessing.

Referring to FIGS. 14 and 15, since calibration is performed between the lidar for generating the reference map and the lidar mounted on the vehicle, point clouds corresponding to vehicles or people that do not exist on the reference map may result in calibration errors.

Thus, the data generator may detect the ground from the plurality of second point cloud data and remove an object having a height of a preset value based on the detected ground. That is, the second point cloud data may perform preprocessing to identify and delete objects such as vehicles and people based on the height from the ground.

In addition, the fitness score used in NDT matching may mean the distance average of points whose distance is less than a predetermined value after matching each point of one of the plurality of second point cloud data with the closest point in the first point cloud data. Thus, in order to reduce the error in the z-axis values of the plurality of second lidars, the specific gravity of the ground should be as large as a wall and a pillar.

Thus, the data generator may detect the ground from the plurality of second point cloud data, approximate the point cloud detected on the ground to a plane, and then interpolate additional points between the point clouds detected on the ground.

Figure 16:
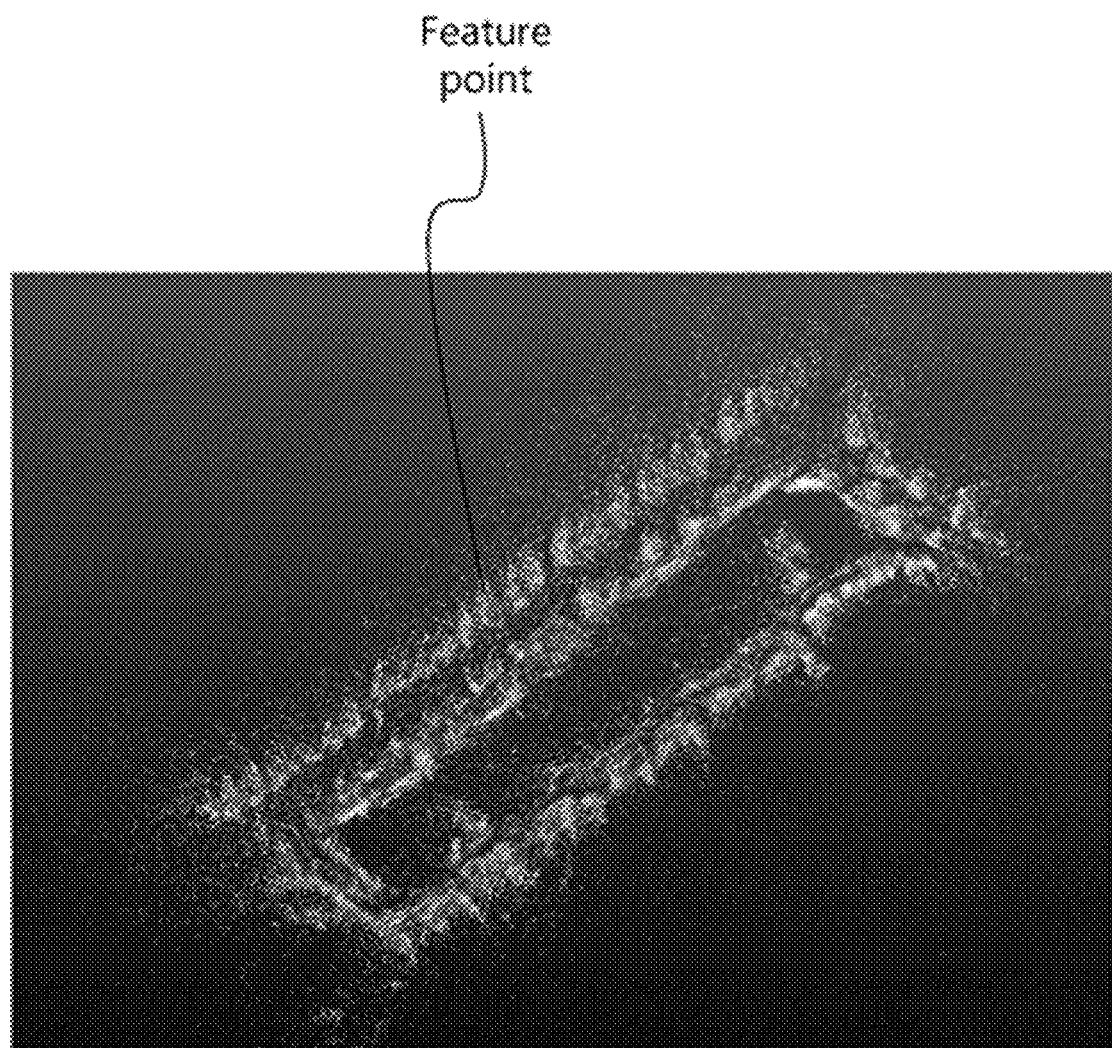
FIGS. 16 and 17 are diagrams illustrating a visual mapping method according to an embodiment of the present disclosure.
Figure 17:
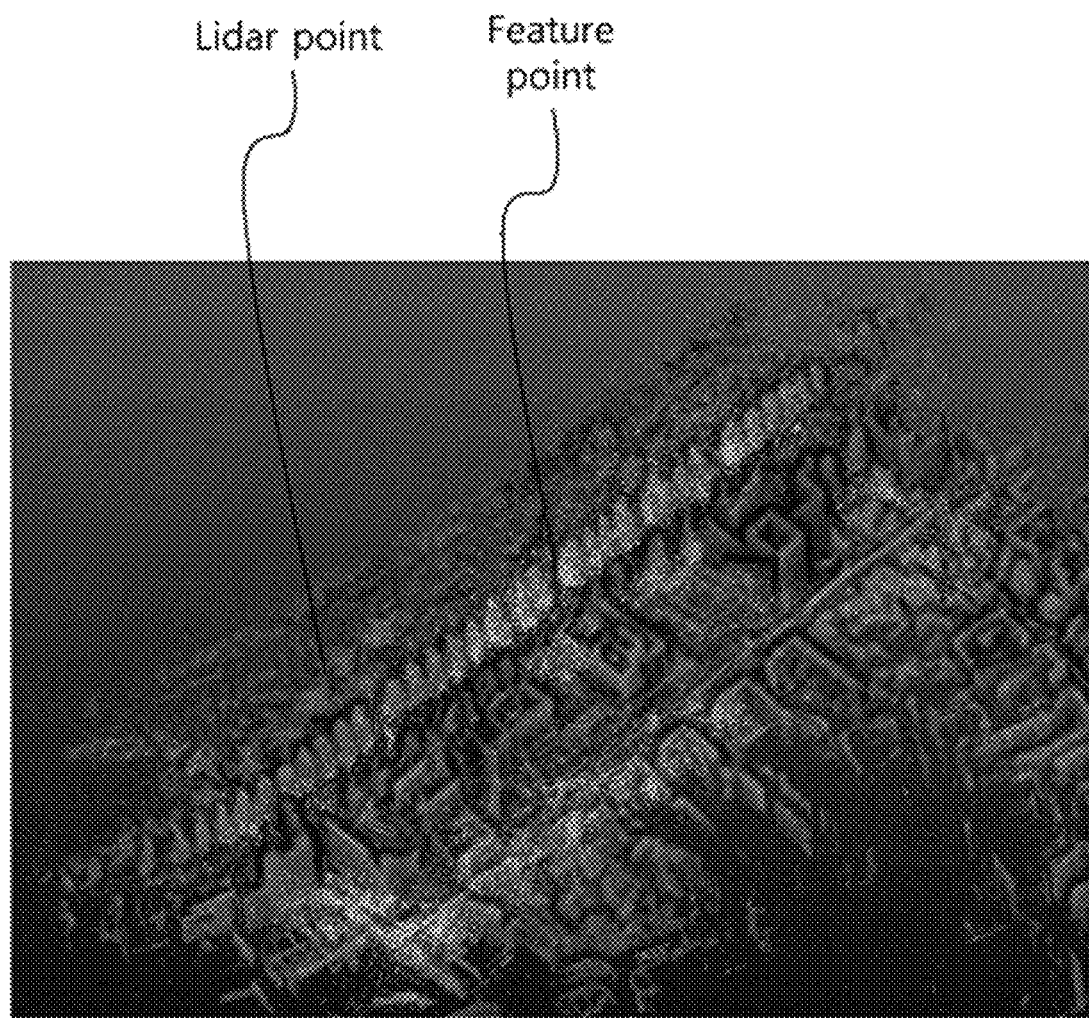

FIGS. 16 and 17 are diagrams illustrating a visual mapping method according to an embodiment of the present disclosure.

Meanwhile, FIG. 16 is a diagram illustrating a first feature map, and FIG. 17 is a diagram illustrating a third feature map obtained by mapping the first feature map to the second feature map.

As shown in FIG. 16, the data generator may generate a feature point map based on the feature point located at the detected corner among feature points extracted based on continuity of brightness. That is, the data generator may generate the first feature map composed of only the feature points extracted from the image.

Next, as shown in FIG. 17, the data generator may generate the third feature map by mapping the first feature map to the second feature map generated through pre-stored point cloud data.

Specifically, the data generator may map the first feature map to the second feature map based on the position information and pose information of the point cloud data acquired simultaneously with the image for generating the first feature map.

As described above, preferred embodiments of the present disclosure have been disclosed in the specification and drawings. However, it is self-evident to those skilled in the art that other modifications may be made in addition to the embodiments disclosed herein. Although specific terms are used in the specification and drawings, they are merely for the purpose of describing particular embodiments only and are not intended to be limiting. Accordingly, the above description should not be construed as restrictive in all respects and should be considered illustrative. The scope of the present disclosure is indicated by the scope of the claims described below rather than a detailed description, and all changes or modifications derived from claims and equivalences thereof should be construed as being included in the scope of the present disclosure.

DESCRIPTION OF REFERENCE NUMERALS

100: data collector 200: data generator
300: data processor
205: communication part 210: input/output part
215: first calibration part 220: second calibration part
225: third calibration part 230: map generation part

What is claimed is:

1. A data generation system comprising:
a data collector mounted on a vehicle to collect data required for generating maps or learning data, wherein the data collector comprises a lidar, an inertial measurement unit (IMU) and a global positioning system (GPS), wherein the lidar emits laser pulses around the vehicle and detects light reflected by objects located around the vehicle to generate point cloud data corresponding to a three dimensional (3-D) image around the vehicle, wherein the IMU detects a change in acceleration due to a change in movement of the data collector, wherein the GPS receives a signal transmitted from a satellite and measures a position of the data collector using triangulation, and wherein the data collector transmits the point cloud data; and
a data generator coupled to the data collector via network and the data generator to perform a calibration method comprising:
receiving the point cloud data from the data collector;
placing the point cloud data on a predefined world coordinate system to generate placed point cloud data;
extracting a region to be used for calibration from the placed point cloud data to generate an extracted region;
identifying at least one object included in the extracted region to be used for calibration, wherein the identifying the at least one object identifies a cylindrical object for horizontal fitting among the placed point cloud data, and identifies a ground for vertical fitting among the placed point cloud data; and
performing calibration on the placed point cloud data by fitting a point cloud included in the at least one object to a pre-stored model, wherein the placing the point cloud data defines the predefined world coordinate system through position information measured from at least one of the GPS and the IMU acquired simultaneously with the placed point cloud data, and wherein the extracting the region extracts at least one trajectory whose heading standard deviation is lower than a preset value, and when two or more trajectories exist in the at least one trajectory, the extracting the region further determines whether trajectories in opposite directions exist by calculating an average heading value of each one of the trajectories in opposite directions.

2. The system of claim 1, wherein the identifying the at least one object extracts a region of a preset size based on a midpoint of an extracted section including the trajectories in opposite directions and perceives the region of the preset size as the ground.

3. The system of claim 2, wherein the performing the calibration calculates a value, obtained by dividing a number of inlier point clouds fitted to a pre-stored cylinder model corresponding to the cylindrical object by a number of point clouds included in the cylindrical object, as a loss for the cylindrical object.

4. The system of claim 3, wherein the performing the calibration calculates a value, obtained by dividing the number of inlier point clouds fitted to a pre-stored ground model corresponding to the ground by a number of point clouds included in the ground, as a loss for the ground.

5. The system of claim 4, wherein the performing the calibration performs a calibration on the placed point cloud data through a loss function based on the loss for the cylindrical object and the loss for the ground.

6. The system of claim 5, wherein the performing the calibration adds a loss for a ratio between the loss for the cylindrical object and the loss for the ground to the loss function.

7. The system of claim 1, wherein the performing the calibration configures at least one identified object into an octree to generate a configured octree, and performs a calibration on the placed point cloud data using a variance summation of each leaf node of the configured octree as a loss.

8. The system of claim 7, wherein the performing the calibration configures a loss function by adding a length of a z-axis of the placed point cloud data to a variance summation loss, and performs a calibration on the placed point cloud data based on the loss function.

* * * * *